(12) United States Patent
Fromovich

(10) Patent No.: US 10,709,524 B2
(45) Date of Patent: Jul. 14, 2020

(54) DENTAL IMPLANT FOR BONE COLLECTION AND DISTRIBUTION

(71) Applicant: Straumann Holding AG, Basel (CH)

(72) Inventor: Ophir Fromovich, Moshav Adanim (IL)

(73) Assignee: STRAUMANN HOLDING AG, Basel (CH)

( * ) Notice: Subject to any disclaimer, the term of this patent is extended or adjusted under 35 U.S.C. 154(b) by 0 days.

(21) Appl. No.: 15/116,948

(22) PCT Filed: Feb. 5, 2015

(86) PCT No.: PCT/IL2015/050139
§ 371 (c)(1),
(2) Date: Aug. 5, 2016

(87) PCT Pub. No.: WO2015/118543
PCT Pub. Date: Aug. 13, 2015

(65) Prior Publication Data
US 2017/0071702 A1 Mar. 16, 2017

Related U.S. Application Data

(60) Provisional application No. 62/100,863, filed on Jan. 7, 2015.

(30) Foreign Application Priority Data

Feb. 5, 2014 (IL) .......................................... 230833

(51) Int. Cl.
*A61C 8/00* (2006.01)
(52) U.S. Cl.
CPC ............ *A61C 8/0022* (2013.01); *A61C 8/006* (2013.01); *A61C 8/008* (2013.01); *A61C 8/0056* (2013.01);
(Continued)

(58) Field of Classification Search
CPC .................................................... A61C 8/0022
See application file for complete search history.

(56) References Cited

U.S. PATENT DOCUMENTS 2,906,705 A 9/1959 Cross
4,264,307 A * 4/1981 Neuwirth ................. A61C 3/06
433/166
(Continued)

FOREIGN PATENT DOCUMENTS

CA 2 817 860 A1 5/2012
CN 101146491 A 3/2008
(Continued)

OTHER PUBLICATIONS

Translation of FR 2906705.*
(Continued)

*Primary Examiner* — Yogesh P Patel
*Assistant Examiner* — Stephen R Sparks
(74) *Attorney, Agent, or Firm* — Oliff PLC

(57) ABSTRACT

The present invention relates to endosseous implants and in particular, to screw form dental implants for implanting within bone. The bone implant is configured to be a self-drilling bone implant that is adept at condensing, collecting and distributing bone along all of the implant's surface and within the implantation site, to significantly increase the bone implant contact surface. The implant is configured to have a coronal portion and a body portion that are continuous with one another. The coronal portion is configured to have a smaller overall diameter than the overall diameter of said body portion. The body portion is fit with threading that facilitates the self-drilling and bone collection properties when the implant is rotates in both the clockwise and counterclockwise directions.

8 Claims, 23 Drawing Sheets

(52) U.S. Cl.
CPC .......... *A61C 8/0059* (2013.01); *A61C 8/0068* (2013.01); *A61C 8/0069* (2013.01); *A61C 8/0074* (2013.01); *A61C 8/0075* (2013.01); *A61C 8/0078* (2013.01); *A61C 8/0089* (2013.01)

(56) References Cited

U.S. PATENT DOCUMENTS

| | | | |
|---|---|---|---|
| 4,738,623 A * | 4/1988 | Driskell | A61C 8/0018 433/173 |
| 5,782,636 A | 7/1998 | Armstrong et al. | |
| 5,782,918 A | 7/1998 | Klardie et al. | |
| 5,842,865 A * | 12/1998 | Bassett | A61C 8/0022 433/174 |
| 6,227,857 B1 * | 5/2001 | Morgan | A61C 8/0018 433/173 |
| 6,382,976 B1 * | 5/2002 | Wagner | A61C 8/0022 433/174 |
| 2005/0152770 A1 * | 7/2005 | Tschakaloff | A61B 17/861 411/403 |
| 2006/0241623 A1 * | 10/2006 | Lim | A61B 17/8625 606/265 |
| 2007/0099153 A1 | 5/2007 | Fromovich | |
| 2008/0261175 A1 | 10/2008 | Hurson | |
| 2008/0261176 A1 | 10/2008 | Hurson | |
| 2008/0280254 A1 * | 11/2008 | Ackermann | A61C 8/0022 433/174 |
| 2008/0286720 A1 | 11/2008 | Reed | |
| 2010/0009316 A1 * | 1/2010 | Hurson | A61C 8/0018 433/173 |
| 2010/0304335 A1 | 12/2010 | Garcia Saban et al. | |
| 2011/0033826 A1 | 2/2011 | Chen | |
| 2011/0070558 A1 | 3/2011 | Park et al. | |
| 2011/0123953 A1 | 5/2011 | Jorneus et al. | |
| 2011/0250564 A1 | 10/2011 | Hung | |
| 2011/0294094 A1 * | 12/2011 | Moshavi | A61C 8/0022 433/174 |
| 2012/0046697 A1 * | 2/2012 | Laster | A61B 17/863 606/301 |
| 2012/0178049 A1 | 7/2012 | Holmstrom et al. | |
| 2012/0214132 A1 | 8/2012 | Takahashi et al. | |
| 2013/0022942 A1 | 1/2013 | Zadeh | |
| 2014/0329202 A1 * | 11/2014 | Zadeh | A61C 8/0025 433/174 |
| 2015/0037759 A1 | 2/2015 | Zipprich et al. | |
| 2015/0086942 A1 * | 3/2015 | Hwang | A61C 3/02 433/174 |
| 2015/0104755 A1 * | 4/2015 | Laster | A61C 8/0018 433/174 |
| 2018/0036102 A1 * | 2/2018 | Shakarchi | A61C 8/0025 |

FOREIGN PATENT DOCUMENTS

| | | | |
|---|---|---|---|
| CN | 102098977 A | 6/2011 | |
| CN | 102697570 A | 10/2012 | |
| CN | 103458822 A | 12/2013 | |
| DE | 3642901 A1 | 7/1988 | |
| DE | 10236125 A1 | 2/2004 | |
| DE | 20 2005 004 909 U1 | 7/2005 | |
| DE | 10 2006 007 541 A1 | 8/2007 | |
| EP | 2 233 107 A1 | 9/2010 | |
| FR | 2906705 A1 * | 4/2008 | .......... A61C 8/0018 |
| JP | 2011-527916 A | 11/2011 | |
| JP | 2011-527917 A | 11/2011 | |
| KR | 101276418 B1 | 6/2013 | |
| RU | 2376955 C1 | 12/2009 | |
| WO | 2004/103202 A1 | 12/2004 | |
| WO | 2009/075459 A1 | 6/2009 | |
| WO | 2010/021478 A2 | 2/2010 | |
| WO | 2011/039162 A1 | 4/2011 | |
| WO | 2013/004703 A1 | 1/2013 | |
| WO | 2013/157756 A1 | 10/2013 | |
| WO | 2013/186765 A1 | 12/2013 | |
| WO | 2014/108906 A1 | 7/2014 | |

OTHER PUBLICATIONS

Jun. 8, 2015 Search Report issued in International Patent Application No. PCT/IL2015/050139.
Jun. 8, 2015 Written Opinion issued in International Patent Application No. PCT/IL2015/050139.
Mar. 6, 2018 Supplemental Extended European Search Report issued in European Patent Application No. 15746722.6.
Oct. 2, 2017 Supplemental European Search Report issued in European Patent Application No. 15746722.6.
Jul. 30, 2018 Examination and Search Report issued in Russian Patent Application No. 2016134719.
Mar. 24, 2020 Office Action issued in Brazilian Application No. 112016018008.9.

* cited by examiner

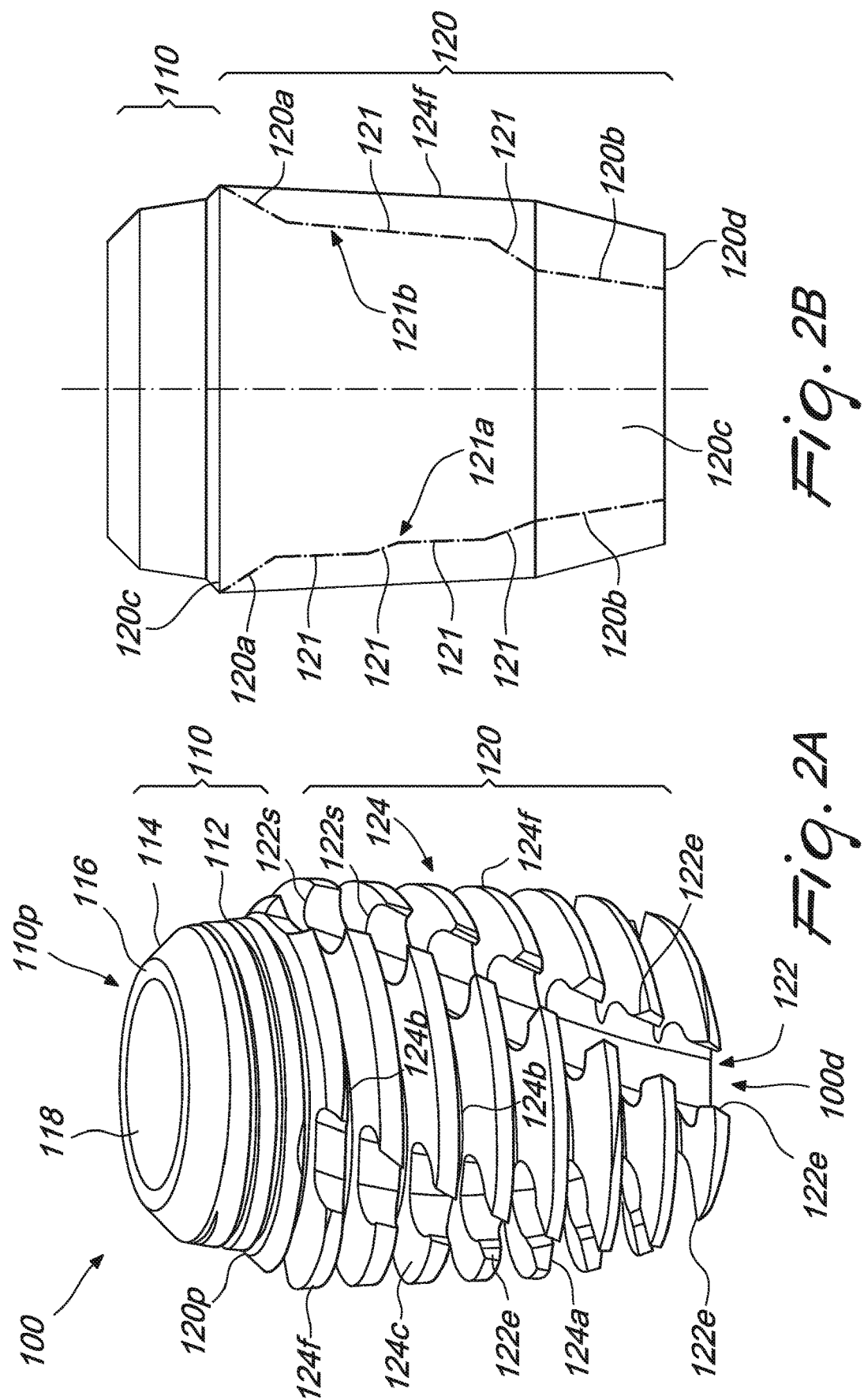

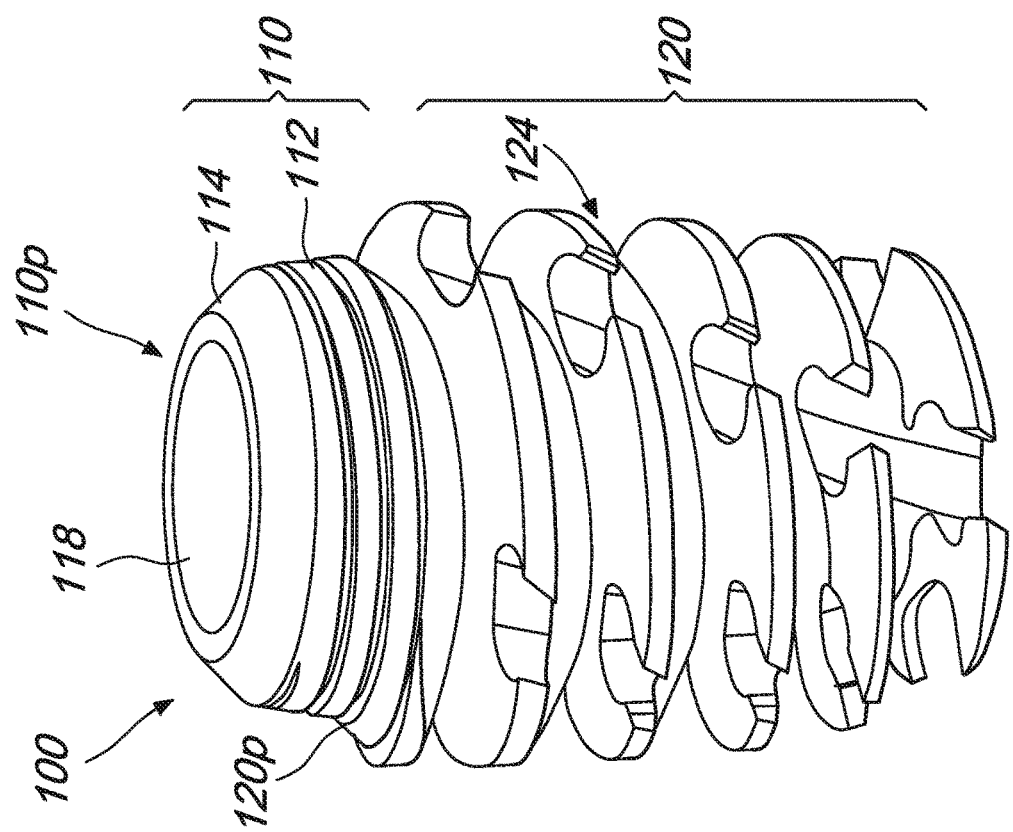
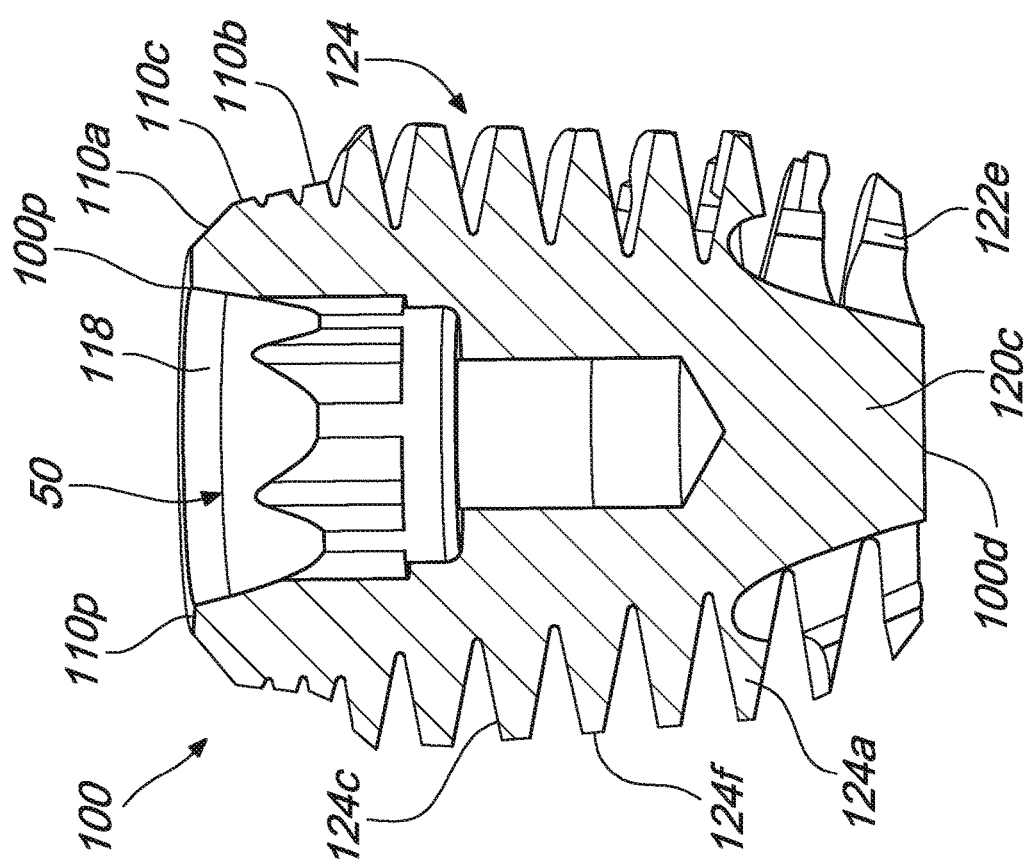

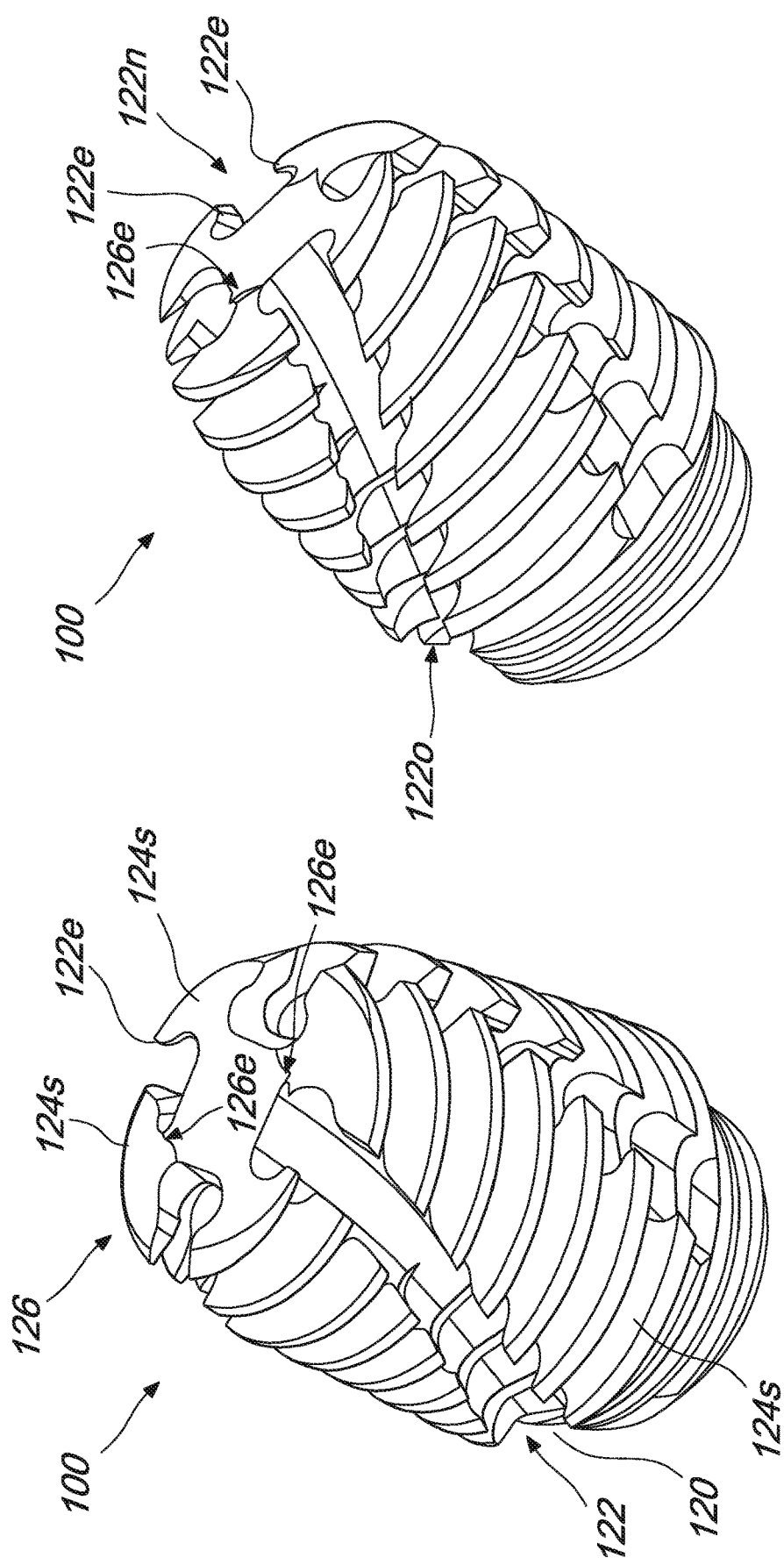

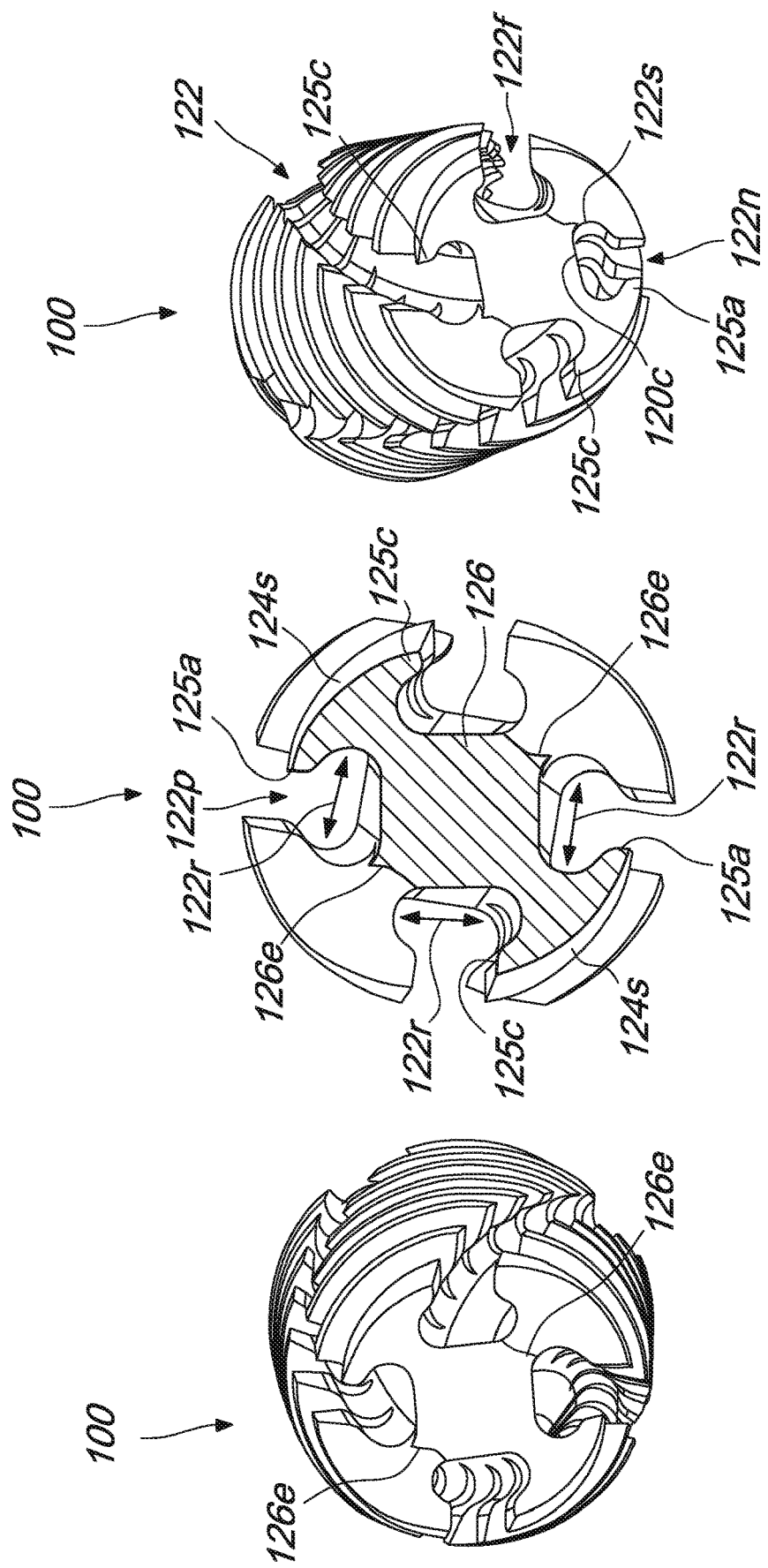

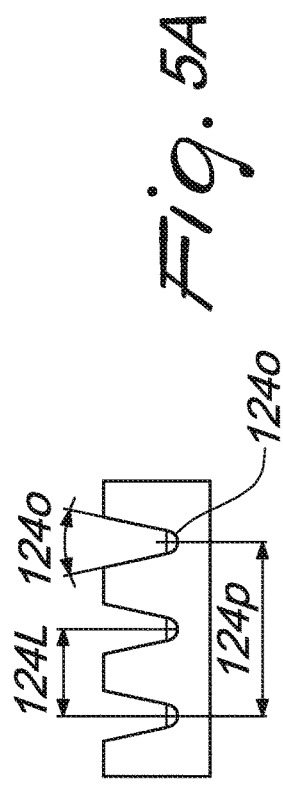
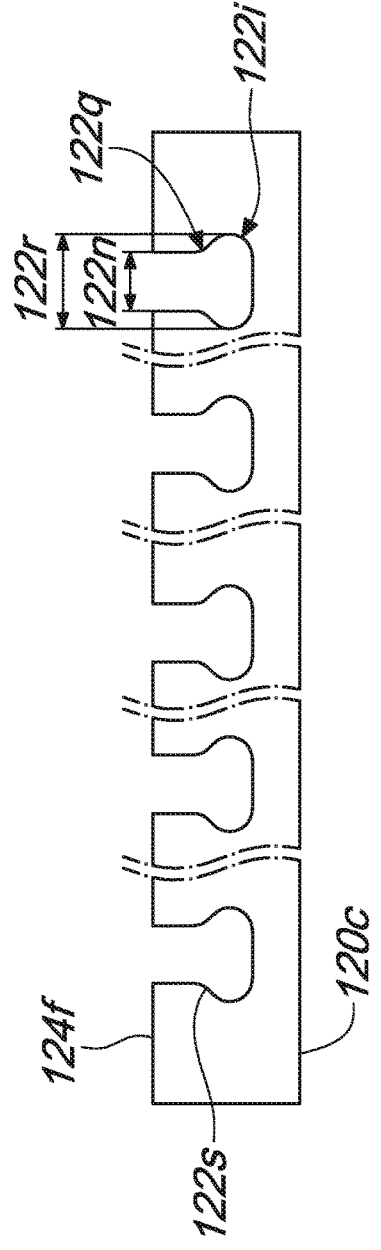
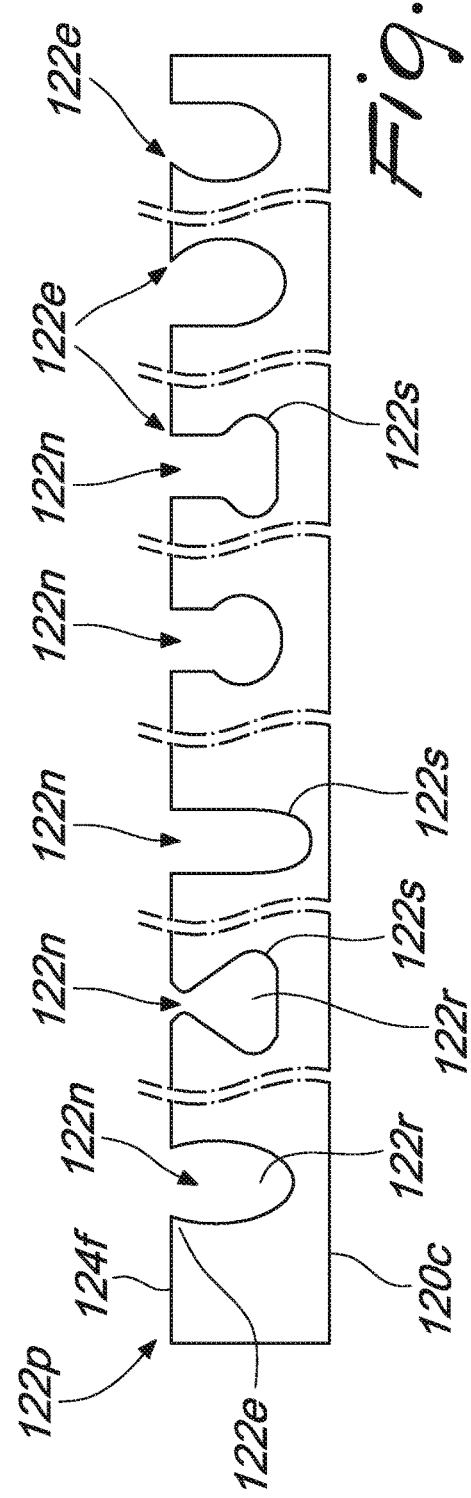

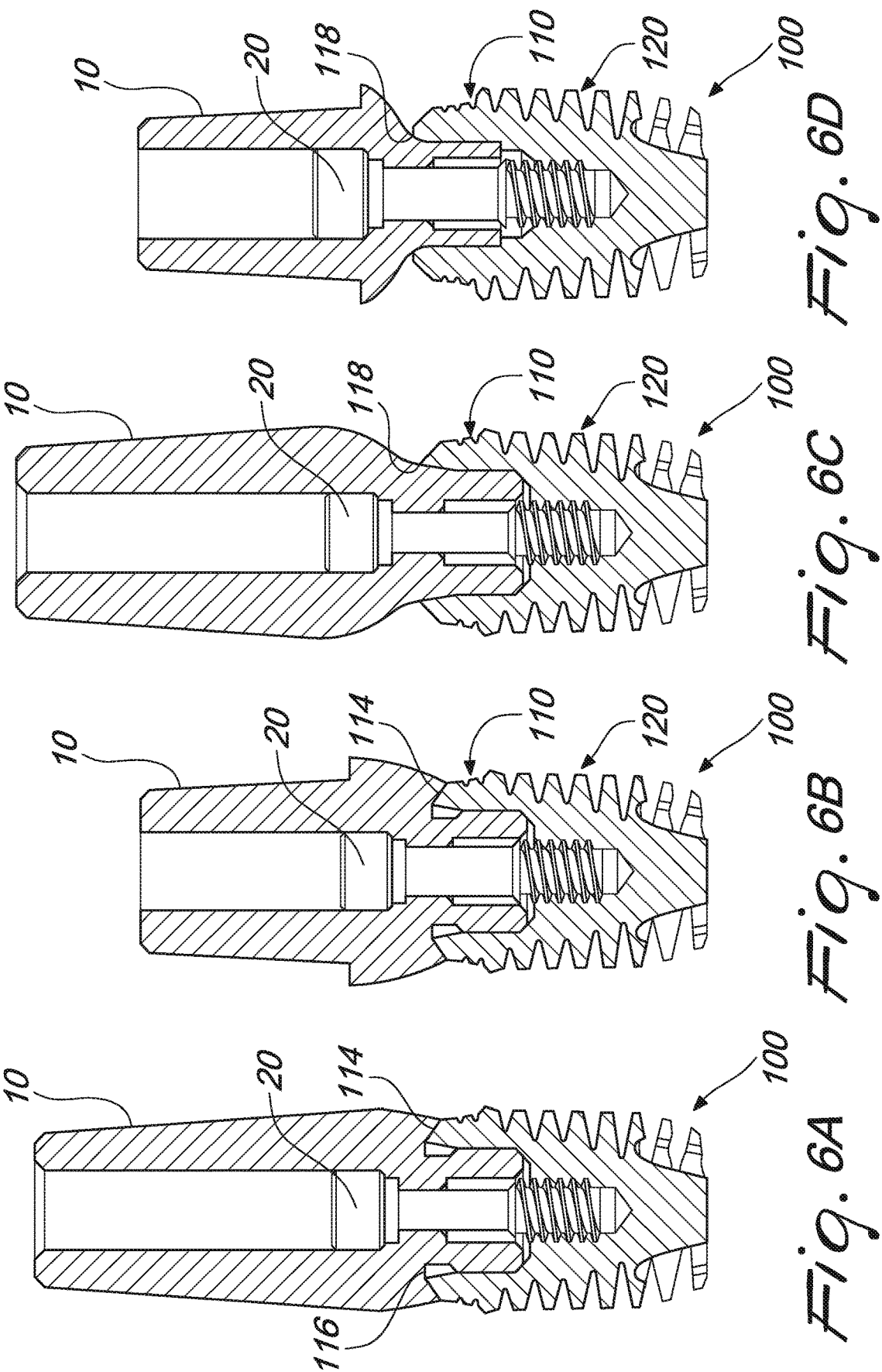

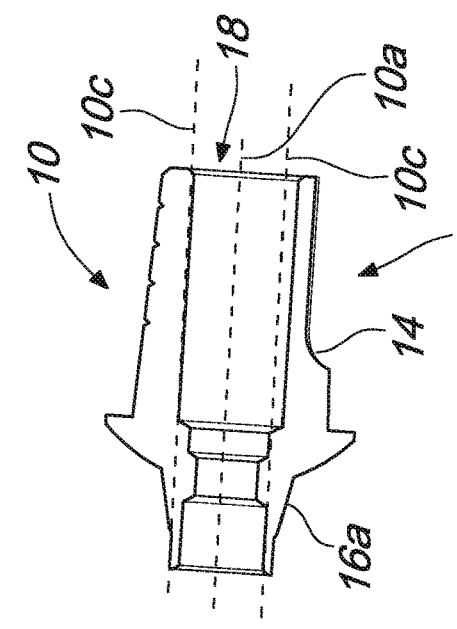
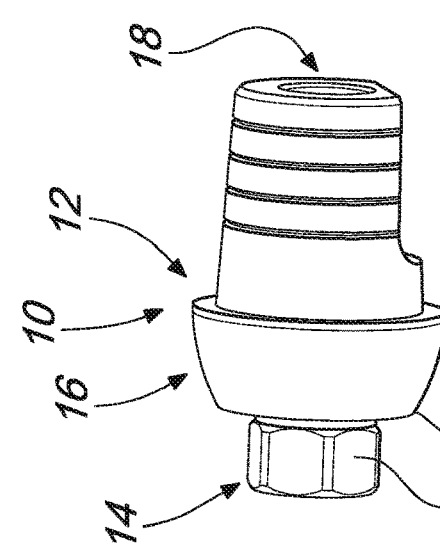
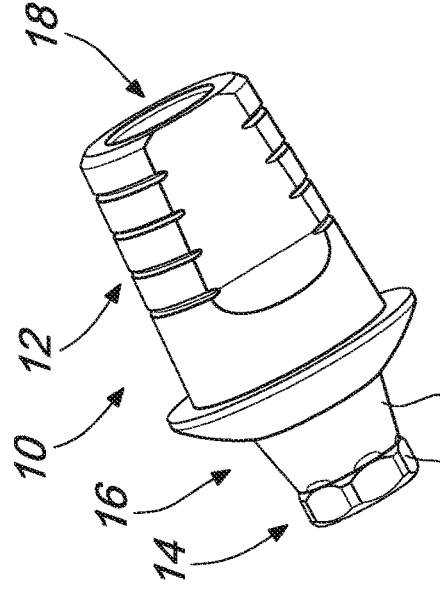
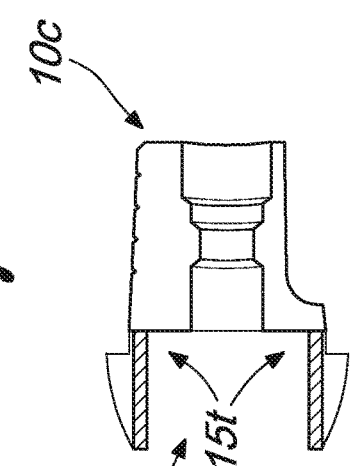
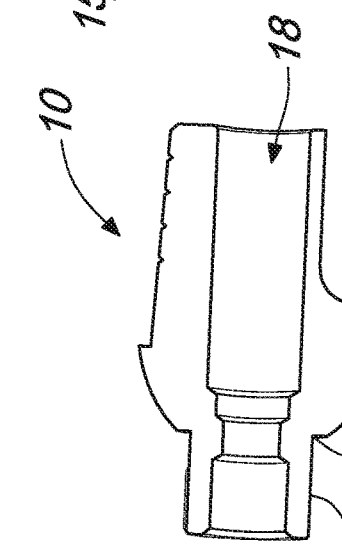
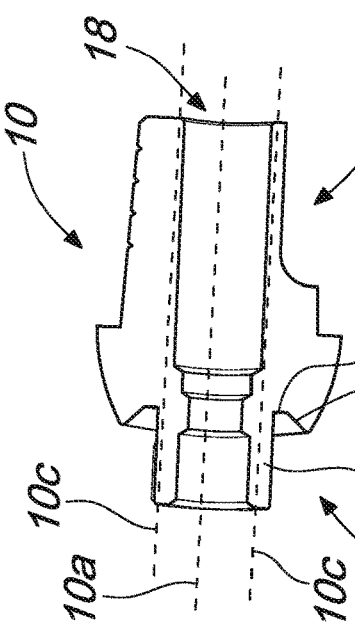

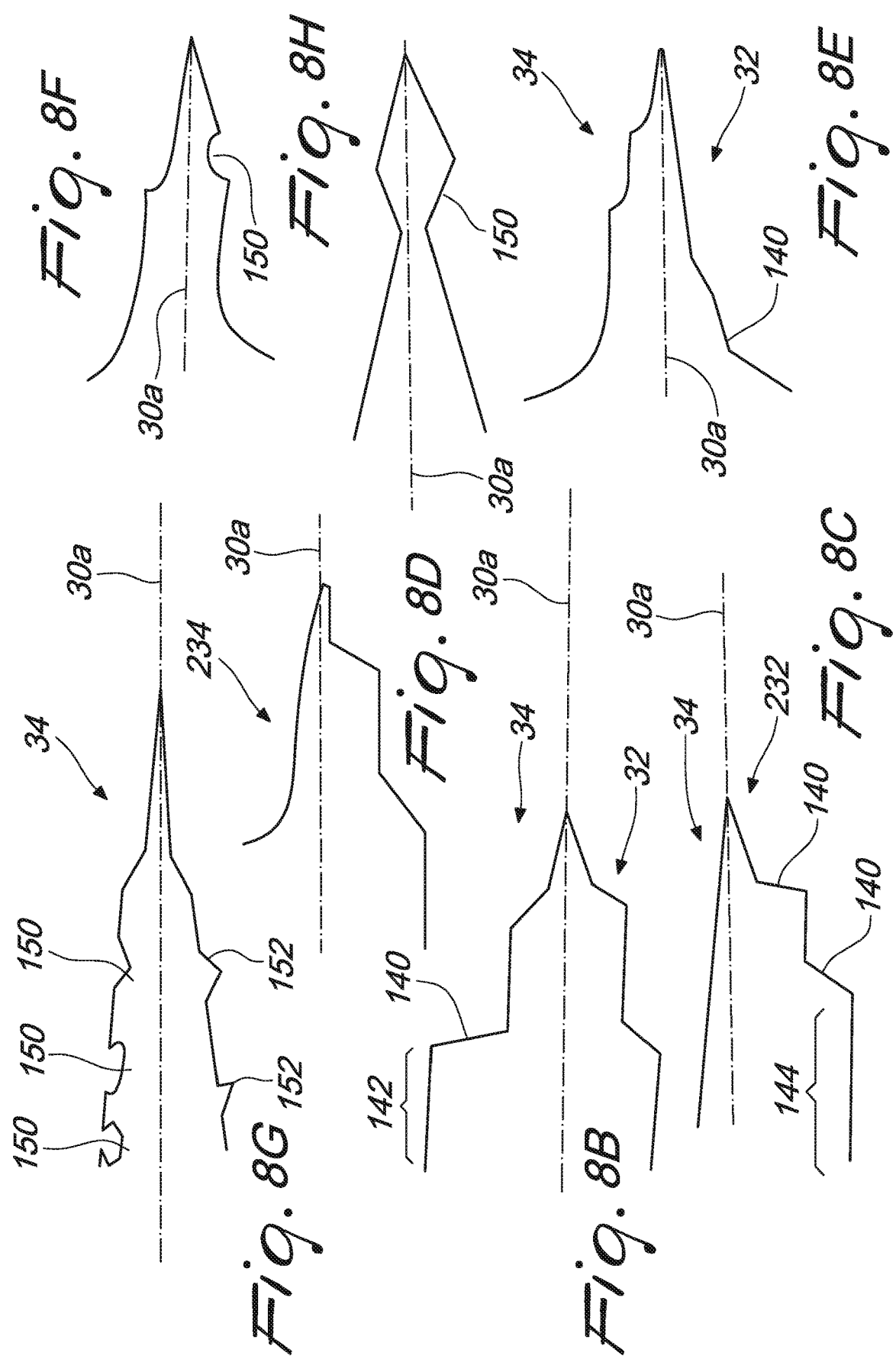

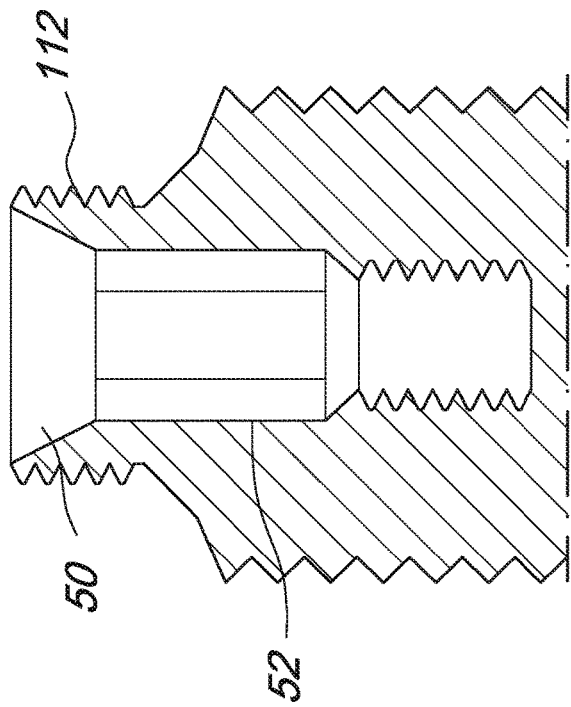
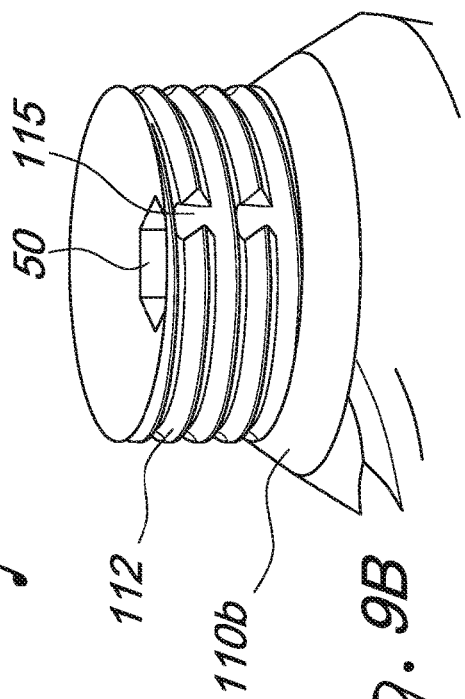
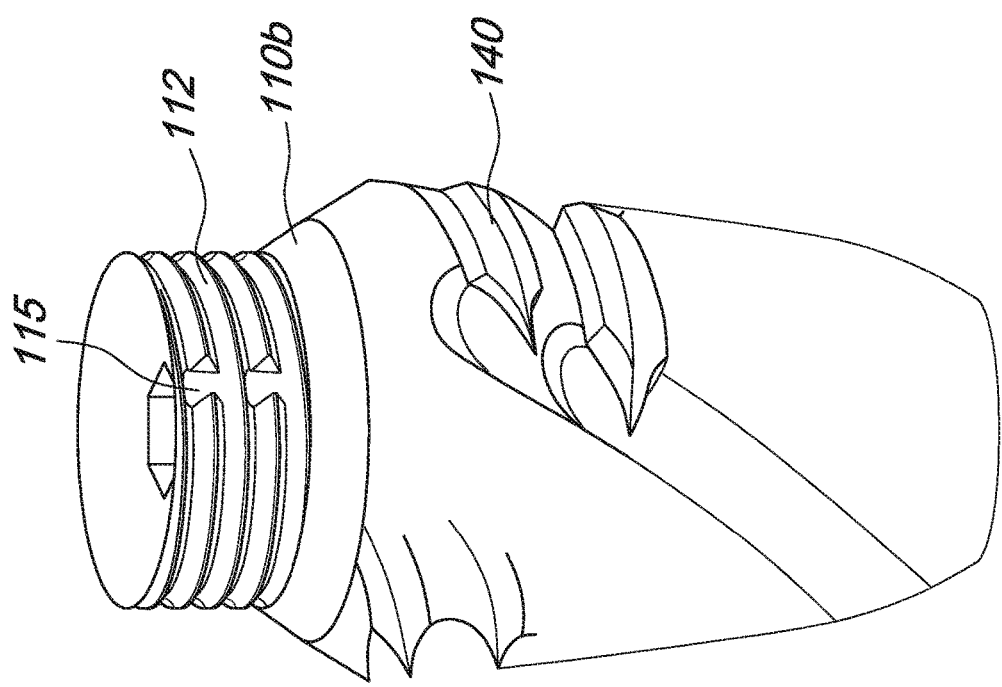

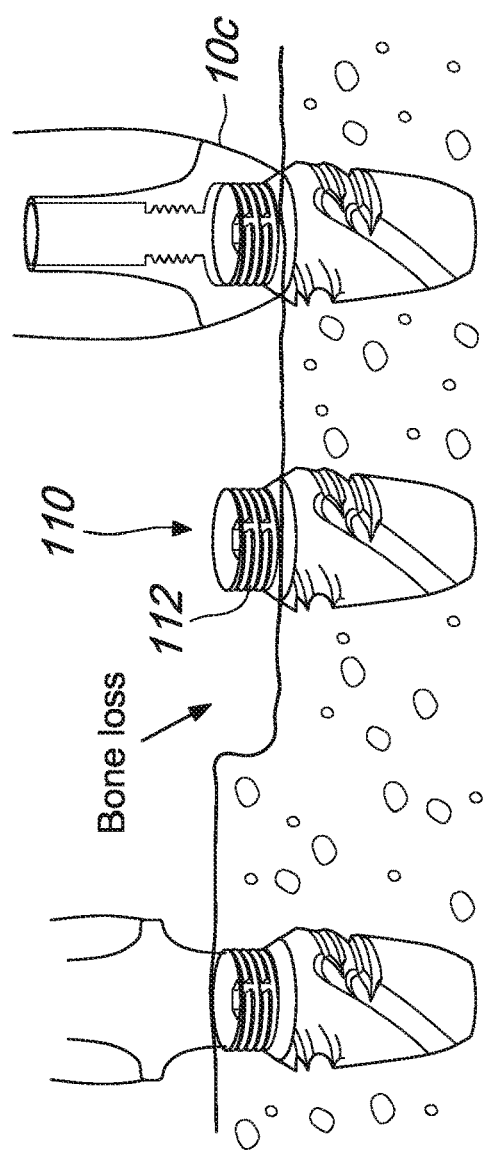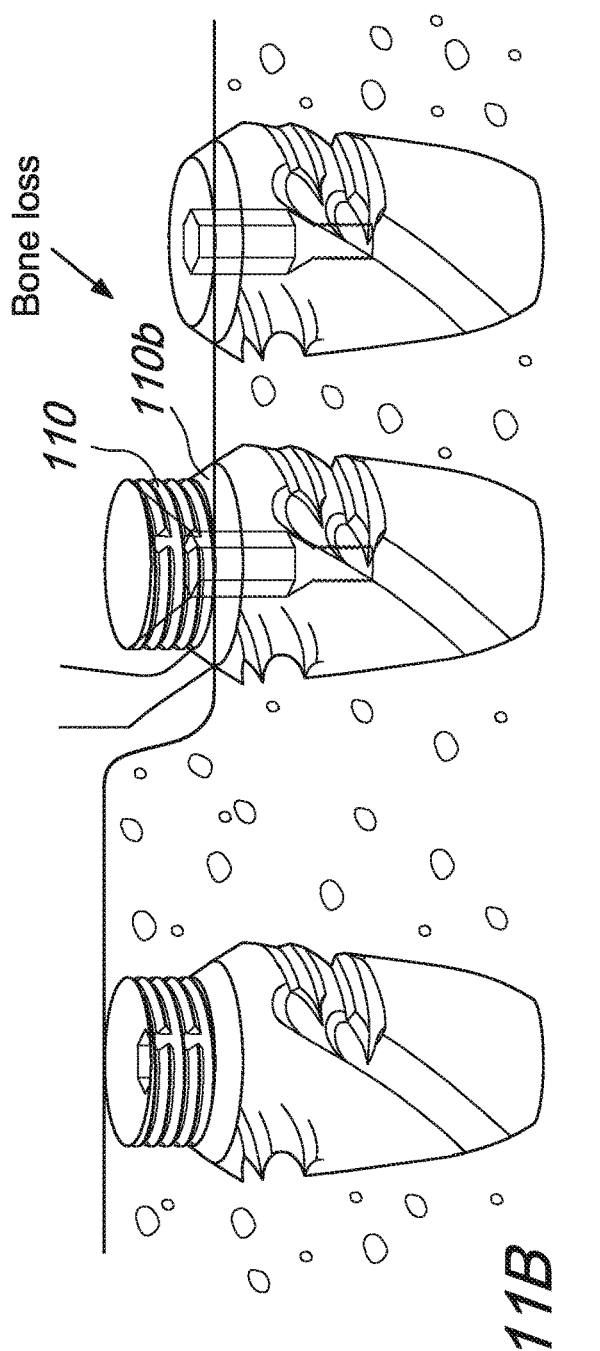

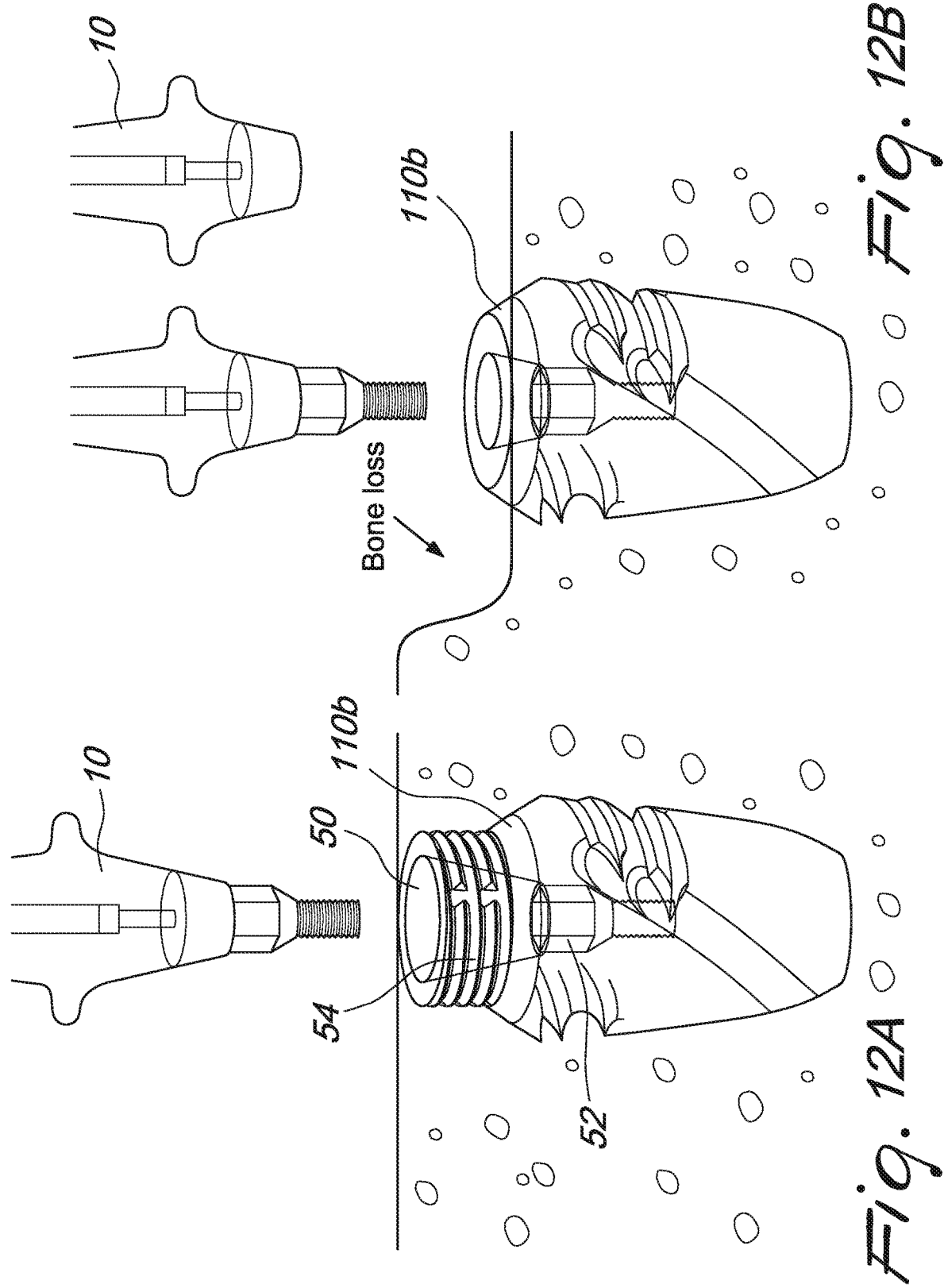

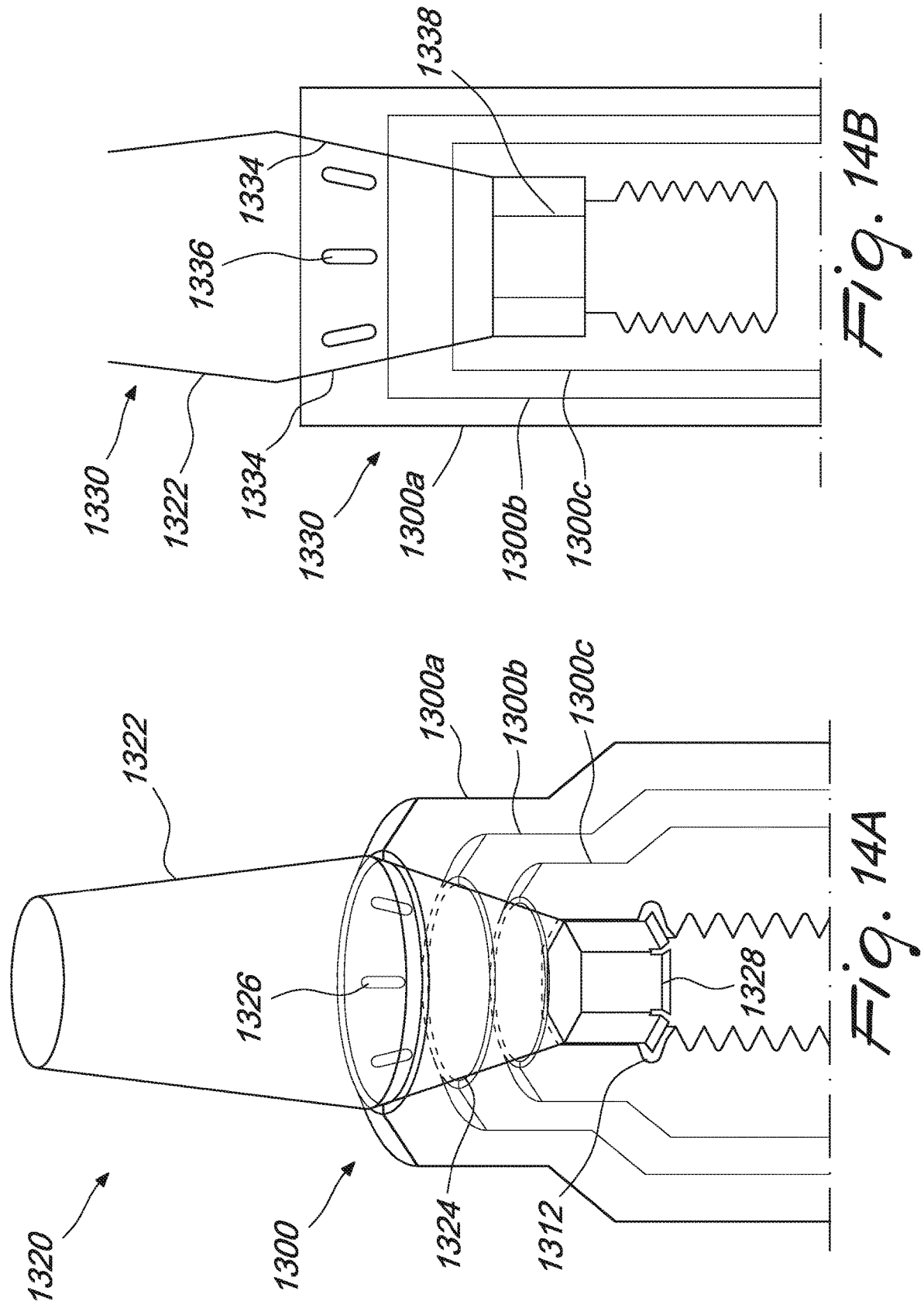

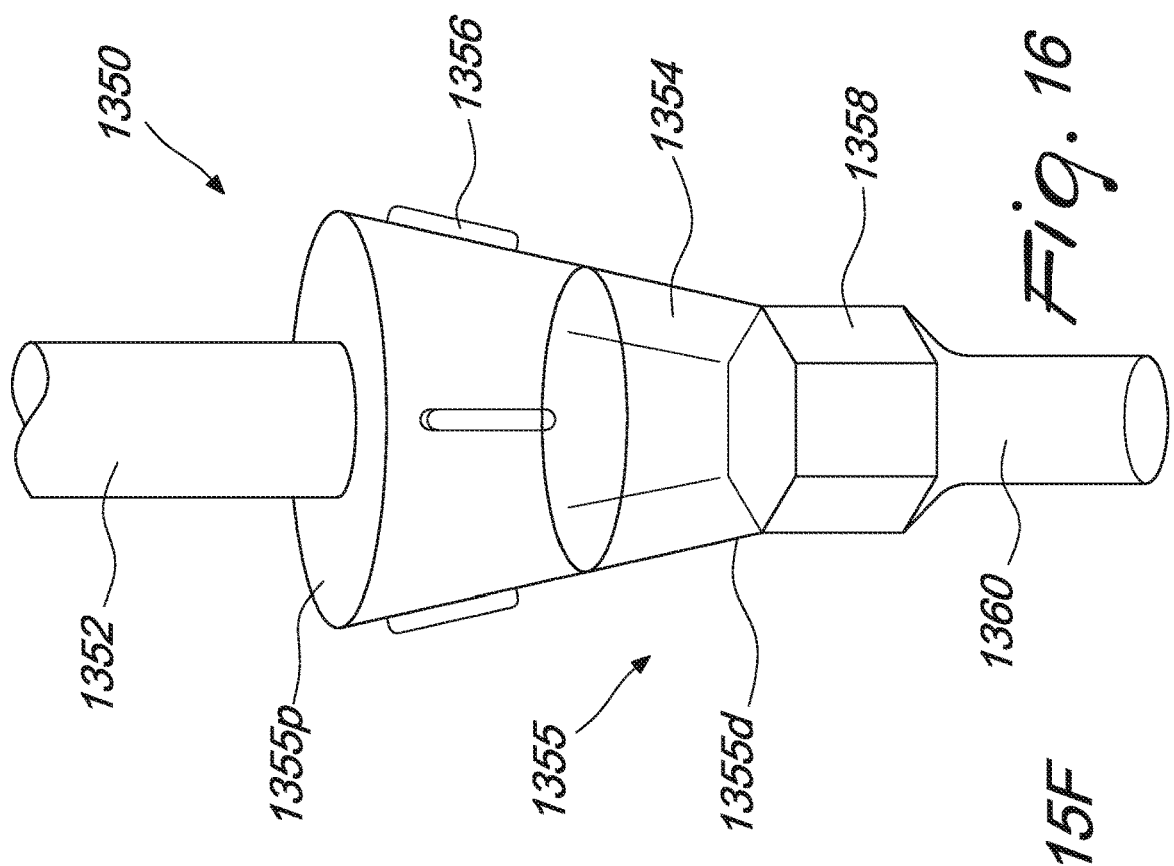
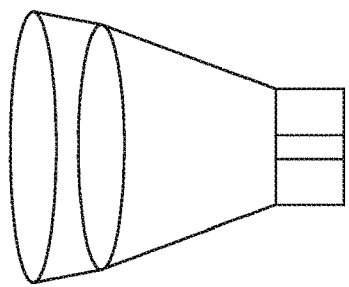
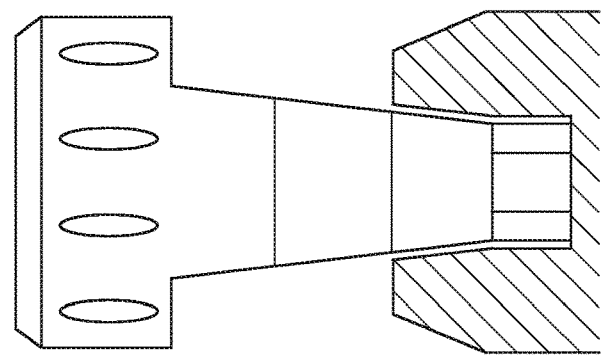

DENTAL IMPLANT FOR BONE COLLECTION AND DISTRIBUTION

FIELD OF THE INVENTION

The present invention relates to endosseous implants and in particular, to screw form dental implants for implanting within bone.

BACKGROUND OF THE INVENTION

A dental implants are provided to replace lost teeth in the oral cavity. Dental implant include various parts that come together to form a structure that replaces a tooth providing both esthetic and functional purposes.

The dental implant generally includes a crown to replace the crown portion of the lost tooth, an implant in place of lost tooth root, where the crown and implant are coupled with one another with an implant abutment. All three parts function together to bring about a successful implant procedure. The implant provides the primary base and support structure of the implant and is therefore a central element to the success of the dental implant.

The dental implant is generally provided as a screw-form device that generally includes a head portion and body portion. The head portion defines the coronal segment of the implant that is provided for facilitating tooling and coupling with other implant structures such as an abutment and crown. The body portion defined the apical segment of the implant that is provided for integrating with the bone allowing for osseointegration.

The implant body portion has various designs that are designed according to many parameters including the bone type to be implanted, the location in which the implantation is to occur, (implantation site). The body portion includes threading along its length that are used to securely introduce the implant into the bone and allow for the implant to integration with the bone.

Despite the advancement in implant design there is a continuing need to improve a dental implant's ability to osseointegrate that in turn will lead to improved implant stability and longevity.

SUMMARY OF THE INVENTION

The present invention relates to endosseous implants and in particular, to screw form dental implants for implanting within bone.

Embodiments of the present invention provide a self-drilling dental implant that is configured to facilitate insertion and osseointegration by condensing, collecting, and distributing bone along all surfaces of the implant. Preferably collection and distribution is provided when the implant is rotated in either the clockwise or counterclockwise directions. Aspects of the present invention may be implemented so as to allow reconfiguration of the implant on all forms of a dental implant in any region of the maxilla and mandible.

Optionally the dental implant of the present invention may be configured to be a molar dental implant replacing teeth in the molar region of the maxilla and/or mandible.

The dental implant according to embodiments of the present invention is a self-drilling, self-tapping, self-collection bone and bone condensing. The implant according to embodiments of the present invention may be utilized at a heal site following bone growth or it may be utilized at an extraction site.

Most preferably an implant according to the present invention is configured to collect and/or distribute bone along all of its surfaces therein increasing the bone implant contact ('BIC') improving the process of osseointegration.

Preferably embodiments of the present invention provides for cutting, mixing, and directing bone within an implantation site.

Preferably the implant according to the present invention may be utilized as a self-drilling implant to facilitate implantation within an extraction site socket and/or a cavity within bone structure, or a heal side extraction site.

Optionally and preferably introducing the implant into an extraction site socket allows a practitioner to optimally maintain the Laminal Dura at the extraction site while simultaneously allowing the implant to engage and/or integrate with at least apportion of the Laminar Dura. Such optimal maintenance of the Laminar Dura significantly improves the overall healing period.

Preferably the implant according to optional embodiments of the present invention provides an implant that functions as an instrument for distributing bone in all directions first by accumulating bone along the implant's surface. Similarly bone matter may be directed into different locations within an implantation site by way of maneuvering the implant in the clockwise and/or counterclockwise direction. Such implant maneuvering provides for direction bone in the upper (coronal) or lower (apical) portions of the implant.

Embodiments of the present invention further provide for introducing bone matter and/or graft materials through the coronal opening of the flutes into the implantation site, either before and/or after integrating the implant within the mandible or maxilla.

Embodiments of the present invention provide a dental implant that facilitates collecting any bone the implantation site from at least one of the extraction site septum, bone graft materials.

Embodiments of the present invention provide an implant that is self-drilling therein capable of expanding the bone at the implantation site optionally to create more space for receiving bone in and around the implant, therein improving the osseointegration and the formation of an initial matrix created for bone osseointegration.

Embodiments of the present invention provide a coronal portion having a smaller overall diameter that facilitates receiving more bone in and around the coronal portion.

Preferably the configuration of the coronal portion having a smaller overall diameter than the body portion provide for pressure equalization, wherein the pressure on the implant may be evenly distributed along the length of the implant at the implantation site. This is a function of the fact that the coronal portion associates with cortical compact and/or dense bone while the body portion of the implant associate with less dense spongious bone. Accordingly having a smaller coronal portion and a wider body portion according to optional embodiment of the present invention provides for balancing the pressure along the length of the implant after implantation. Such pressure equalization delay, reduced and/or may prevent bone resorption due to imbalanced pressure distribution on the implant. The pressure equalization allows the implant to control and/or adjust the fixation torque as a function of the implant thread that is configured to facilitate cutting, tapping and collect bone when maneuvered in both the clockwise and counterclockwise directions. Optional embodiments allow both the body portion threads and coronal portion threads to be cutting thread allows for controlling the pressure along the length of the implant and bone material may be maneuvered around any portion of the implant.

Embodiments of the present invention provide a coronal portion that comprises a plurality of at least three or four dental implant prosthetic connection platforms.

Embodiments of the present invention provide a self-drilling implant that may facilitate change direction of the implantation during implantation. Such directional control of the implant as a result of the self-drilling threads provides a practitioner with the freedom to maneuver the implant within the bone as is called for according to the clinical situation at hand. Specifically a practitioner may utilize the implant according to the present invention to expand the bone in the buccal direction and therefore may position the implant in a clinically ideal position. Such directional control provides for controlling the implant's insertion angle and/or direction.

Embodiments of the present invention and in particular control maneuvering and movement of bone within an implantation site by virtue of the ability of the implant to cut and distribute bone during rotation in both clockwise and counterclockwise direction, further allows a clinician to facilitate a sinus lifting procedure. Preferably maneuvering (rotating) the implant as needed so as to distribute and condense bone toward the apical end allows to facilitate bone growth in and around the implant apex.

Optionally the implant according to optional embodiments may be utilized to break the sinus floor to allow for bone introducing bone into the apex to facilitate sinus lifting bone formation.

Embodiment of the present invention provides a dental implant comprising a coronal portion and a body portion, where the overall diameter of the coronal portion is smaller than the overall diameter of the body portion. The implant is characterized in that the coronal portion provides the implant with at least three connection platforms. Most preferably the coronal portion may be composed from three substantially cylindrical segments and/or circular-cylindrical segments that are continuous with one another.

Optionally at least one coronal portion segment may comprise a trapezoidal cross-sectional profile. Optionally and preferably each of three segments comprises a trapezoidal cross sectional profile.

Optionally at least one coronal portion segment may comprise a circular cylindrical cross-sectional profile.

Embodiments of the present invention provide a dental implant comprising a coronal portion and a body portion, where the overall diameter of the coronal portion is smaller than the overall diameter of the body portion, wherein the implant is characterized in that the coronal portion may be configured to be facilitate removable and/or excised from the implant body.

Optionally the coronal section may be configured to be removable following implant placement. Optionally the coronal section may be configured to be removable following implant placement following bone resorption.

Optionally the coronal section may be configured along at least a distal portion thereof to facilitate removal of the coronal segment.

Embodiments of the present invention provide a dedicated tool provided for filing and or removing a coronal segment of a dental implant, the device featuring:

a dental tooling connection interface for coupling with a dental hand piece tool;

a discoid tooling surface having at least one surface and/or edge that may be coated with a corrosive medium that is provided for cutting and/or filing at least a portion of the coronal segment of a dental implant;

an implant interface portion provided for inserting into a dental implant's central borehole, the interface portion including: a central body portion for fitting within an implant's central borehole recess; a ring portion provided for allowing said tool to freely rotate while associated with said implant borehole; a distal end cap for securely associating the tool with at least a portion of borehole portion and for sealing said implant borehole.

Embodiments of the present invention provide a dedicated tool provided for filing and/or facilitating the removal of a coronal segment of an implanted dental implant, the device featuring:

a dental tooling connection interface for coupling with a dental hand piece tool;

a cylindrical tooling body functionally coupled with the dental tooling interface and configured to rotate when activated with said dental hand piece tool; said cylindrical tooling body having at least one tooling surface and/or edge that is coated with a medium provided for cutting and/or filing at least a portion of the coronal portion of a dental implant; and a tooling stopping interface portion provided for limiting the progressing of the cylindrical body along the coronal segment of the implant.

Embodiments of the present invention provide a method for treating bone resorption of an implanted dental implant following dental implantation the method comprising: exposing, cleaning and isolating an implanted implant's coronal segment; associating a coronal removal tool according to optional embodiments of the preset invention; filing the coronal segment of implant to desired level relative to the bone surface; and coupling a new implant abutment with the dental implant.

Optionally the new implant abutment may be coupled to the implant with a fixation screw.

Embodiments of the present invention provide a method for treating bone resorption following dental implantation the method including: exposing, cleaning and isolating the an implanted implant's coronal segment along the coronal segment's external surface, wherein the external surface is configured and/or primed to be coupled with an abutment.

Optionally the coronal segment's external surface is threaded to match threading disposed along a surface of an abutment. Optionally is the abutment may be configured to be placed over and/or coupled along the coronal segment having external threading, wherein the abutment is configured to have threading corresponding to the coronal segment's threading.

Optionally the abutment may be associated with the external surface of the coronal segment wherein the abutment is coupled with the implant utilizing a fixation screw.

Optionally following exposure of the coronal portion the coronal portion may undergo a treatment to facilitate coupling between an abutment and the treated coronal portion.

Optionally the coronal portion may undergo rethreading the external surface of the coronal section.

Optionally the external surface of the coronal portion may be resurfaced with a dedicated tool to facilitate receiving and/or coupling with an abutment.

Embodiments of the present invention provide a bone implant anchor comprising a coronal portion and a body portion that are continuous with one another, the coronal portion defining the proximal end of the implant anchor and the body portion defining the distal end of the implant anchor, the body portion having an inner core fit with threading extending therefrom along its length; the inner core defining an internal diameter of the body portion and said threading defining the external diameter of the body portion, the coronal portion characterized in that it features at least one or more recessed grooves along its external surface. Preferably the recessed grooves are provided for facilitating bone integration.

Optionally the external segment of the coronal portion may be feature threading configured for engaging and/or coupling with an abutment.

Embodiments of the present invention provide a bone implant anchor comprising a coronal portion and a body portion that are continuous with one another, the coronal portion defining the proximal end of the implant anchor and the body portion defining the distal end of the implant anchor, the body portion having an inner core fit with threading extending therefrom along its length; the inner core defining an internal diameter of the body portion and the threading defining the external diameter of the body portion, the coronal portion characterized in that it features functional cutting threads disposed along the coronal portion's external surface that is provided for cutting into cortical bone. Optionally coronal portion threading is configured for cutting, condensing, collecting, distributing bone along the external surface of the coronal portion.

Optionally the control portion threading may be configured to cut, condense, collecting, distribute bone along the external surface of the coronal portion, wherein the implant is rotated in at least one of the clockwise and/or counter clockwise directions. Optionally the implant coronal segment may be configured to cut, condense, collect, distribute bone when rotated in both the clockwise and counterclockwise directions.

Embodiment of the present invention provides a dental implant comprising a coronal portion and a body portion, where the overall diameter of the coronal portion is smaller than the overall diameter of the body portion. The implant characterized in that the body portion comprises a core having threading extended therefrom, the threading defining the external diameter of the body portion and the core defining the internal diameter of the body portion. Most preferably the core comprises at least two or more substantially cylindrical segments and/or circular cylindrical segments that are fluid with one another.

Optionally the core may comprise a plurality of substantially cylindrical sub-segments that are fluid with one another.

Optionally individual sub-segments defining the implant core may assume a cylindrical profiles or a trapezoidal profile.

Optionally the core may comprise a plurality of substantially circular cylindrical sub-segments that are fluid with one another.

Embodiment of the present invention provides a dental implant comprising a coronal portion and a body portion, where the overall diameter of the coronal portion is smaller than the overall diameter of the body portion. The implant characterized in that the body portion comprises threading along its length and at least two flutes spanning the full length of the body portion.

Optionally and preferably the flutes are configured to have a proximal opening that is adjacent to the coronal portion of the implant. Most preferably the flutes may be disposed along the length of the threading extending from the core of the body portion. The flutes therefore divide the thread into at least thread sub-segments having a blade and/or wing like configuration.

Preferably the flutes comprise an ovoid configuration adjacent the body core and a neck adjacent the threading lateral edge and/or thread face. Optionally and preferably the ovoid configuration provides collecting bone fragments while the neck portion provides at least two cutting beveled edges. Preferably the flutes are configured so as to allow collecting and cutting of bone when the implant is rotated in either the clockwise or counterclockwise directions.

Optionally and preferably the flutes of the present invention may provide and facilitate osseointegration as the flutes provide for at least one or more selected from the group consisting of collecting bone, compacting bone, introducing bone, removing excess bone, the like or any combination thereof.

Most preferably the flutes and threading combine to facilitate implant insertion and integration by way of cutting, collecting, condensing and distributing bone along the implant's surface, for example including but not limited to within the flute recess, along the threading, between threading, or the like. Most preferably the flutes provide for increasing stability of the implant at the implantation site by increasing the Bone Implant Contact ('BIC') and therein providing a matrix that facilitates osseointegration.

Embodiment of the present invention provide an implant abutment having: a proximal end for interfacing with a restorative structure; a distal end for interfacing with an implant; and a medial portion disposed there between; wherein the medial portion includes at least one connection platform coupling surface that is adapted for interfacing with at least one connection platform of an implant's coronal segment. The connection platform surface selected from the group for example including but not limited to: a surface having an angle of about 3 degrees and up to about 50 degrees;

a surface having an angle up to about 70 degrees relative to a surface extending substantially perpendicular to the central axis of the abutment core; a surface that is substantially perpendicular to the central axis of the abutment core;

a surface that is fit with threading so as to allow coupling with the coronal segment by way of threading that corresponds to threading disposed along the external surface of an implant's coronal segment; and any combination thereof.

Embodiment of the present invention provide a bone implant anchor comprising a coronal portion and a body portion that are continuous with one another, the coronal portion defining the proximal end of the implant anchor and the body portion defining the distal end of the implant anchor, the body portion having an inner core fit with at least one threading extending therefrom along its length; the inner core defining an internal diameter of the body portion and the at least one threading defining the external diameter of the body portion; the threading defining a defined along the horizontal plane of the implant, the threading horizontal plane having a first axis along medial-lateral axis between along the length of thread and a second axis along the anterior posterior axis that extends around the implant core, the thread comprising: an apical side, a coronal side, and a lateral edge connecting the apical side and the coronal side, a base connecting the thread to the core, a thread depth defined between the lateral edge and the base along the (along the medial-lateral axis); wherein adjacent threads defined between adjacent thread base are connected over the external surface of the implant core defining an inter-thread face; the at least one or more threading characterized in that at least one of the thread apical side surface, the thread coronal side surface or lateral edge is fit with at least one contour modification along the horizontal plane therein defining at least two sub-segments along the horizontal plane along at least one of the medial-lateral axis or the anterior-posterior axis.

Optionally the thread may further comprise at least one or more contour modifications simultaneously along both axis of the horizontal plane.

Optionally the contour modifications may be symmetric about the horizontal plane.

Optionally the contour modifications may be asymmetric about the horizontal plane.

Optionally the threading may be fit with a plurality of recessed grooves. Optionally the threading may be fit with a plurality of extension.

Embodiments of the present invention provide a dental implant having an internal connection platform borehole that is configured to receive a universal implant abutment. The internal connection platform is a borehole that extends from the proximal end of the implant borehole into the medial portion of the implant body. The internal connection platform is preferably centered along the implant diameter core. The implant connection platform comprises a distal portion, a medial portion and a proximal portion that are fluid and continuous with one another, wherein the connection platform is characterized in that the proximal portion comprises a universal conical profile.

Most preferably connection platform is further characterized in that it comprises at least two anti-rotational interfaces a first anti-rotational interface disposed along the medial portion and a second anti-rotational interface disposed along the proximal portion adjacent to the implant's proximal end.

Preferably the distal portion is a substantially cylindrical borehole featuring threading that is provided for coupling with a fixation screw as is known in the art.

Preferably the medial portion defines an anti-rotation interface in the form of an anti-rotation tooling interface that is provided for manipulating the implant with tools. Optionally medial portion anti-rotation connection interface may be provided in any anti-rotation tooling interface as is known in the art for example including but not limited to at least one or more selected from the group consisting of internal six receptor sockets, scalloped, internal dodecagon, external dodecagon, internal hex internal, external hex, external octagon, internal octagon, external spline, internal spline, Morse taper, internal Morse taper, one piece, internal six lobe, external six lobe, internal tri lobe, external tri-lobe, internal six spline, external six-spline, internal thread, internal pentagon, external pentagon, external thread, internal square, external square, internal five lobe, internal four lobe, internal three spline, external triangle, internal eight spline, external six lobe, internal eight lobe, internal tube to tube plug in, triangular, polygonal of n sides where n>=3 or more, the like as is known in the art or any combination thereof.

Most preferably the proximal portion is provided in the form of a substantially conical borehole having a its small diameter at its distal end bordering the medial portion and a large diameter at the proximal end defined at the implants proximal end.

Optionally and preferably the conical borehole defines a wall that is provided with a uniform angle and/or slope along the length of the proximal portion from the distal end to the proximal end.

Optionally the conical borehole may define a wall that is provided with at least two angles and/or slopes along the length of the proximal portion from the distal end to the proximal end, therein defining two proximal portion conical sub-segments that are continuous and fluid with one another. Preferably the first sub-segment is provided with a first angle and/or slope and the second sub-segment is provided with a second angle and/or slope characterized in that the second angle and/slope is bigger than the first angle and/or slope relative to a common midline plane.

Most preferably the proximal portion is fit with a second anti-rotation interface adjacent to the proximal end of proximal portion. Most preferably the second anti-rotation interface is provided along the conical borehole surface and/or wall. Preferably the second anti-rotation interface maintains the overall conical surface of the proximal portion. Most preferably the second anti-rotation interface is provided in the form of a plurality of recesses dispersed along proximal portion wall adjacent to the proximal end. Optionally the recess may be configured to be horizontal or longitudinal along conical surface wall. Optionally and preferably the second anti-rotation interface may be provided in the form of a plurality of interdigitating recesses dispersed along the conical borehole surface and/or wall.

Optionally the second anti-rotation interface may be provided with at least two or more inter-digitation recesses, Optionally the internal connection platform borehole may further feature a circumferential recess and/or groove along at least one of the medial portion and/or the proximal portion.

Optionally proximal portion may be fit with a circumferential recess and/or groove along distal end that is adjacent to and/or bordering with the distal portion. Optionally the circumferential recess may be configured to receive an O-ring for facilitating sealing and/or secure coupling with optional dental structures for example including but not limited to abutments, healing caps, impression coping abutment, measuring abutments, tools or the like.

Optionally medial portion may be fit with a circumferential recess and/or groove along its distal end that is adjacent to and/or bordering with the distal portion. Optionally the circumferential recess may be configured to receive an O-ring for facilitating sealing and/or secure coupling with optional dental structures for example including but not limited to abutments, healing caps, impression coping abutment, measuring abutments, tools or the like.

Optionally medial portion may be fit with at least one or more recess and/or groove along its distal end that is adjacent to and/or bordering with the distal portion.

Embodiments of the present invention provide a dental implant abutment having an implant interface segment and a crown interface segment. The abutment characterized in that the implant interface segment is configured to be a universal abutment interface capable of fitting a plurality of dental implant of various diameters and/or sizes. The abutment is further characterized in the implant interface segment comprises at least one anti-rotational connections a first anti-rotational connection disposed along the distal part of the implant interface segment.

The abutment's implant interface segment includes a distal portion and a proximal portion, the distal portion provided in the form of an anti-rotational interface provided for matching the implant's anti-rotational interface.

Optionally the abutment may comprise at least two anti-rotational connection platforms a first anti-rotational connection platform disposed along the distal portion of the implant interface segment and a second anti-rotational connection platform disposed along the proximal portion of the implant interface segment. Optionally at least one of the two anti-rotational connection platforms may be provided in the form of inter-digitation connectors. Optionally both of the two anti-rotational connection platforms may be provided in the form of inter-digitation connectors.

Optionally the distal portion's anti-rotational interface may be fit with a snap fit male connector for example including but not limited to a cog and/or flange and/or extension, the like or any combination thereof. Most preferably the snap fit male connector is provided to fit and securely couple with a corresponding female connector and/or recess disposed along an implant connection platform.

The abutment characterized in that the proximal portion of the abutment's implant interface segment features an external surface having conical profile that is widest at its proximal end adjacent and/or bordering with the abutment's crown interface segment, and configured to be narrowest adjacent to and/or bordering with the distal portion of the abutment's implant interface segment.

Optionally and preferably the proximal portion's conical external surface defines a wall that is provided with a uniform angle and/or slope along the length of the abutment's implant interface segment's proximal portion.

Optionally proximal portion's conical external surface defines a wall that is provided with at least two angles and/or slopes along the length of the proximal portion, therein defining two proximal portion sub-segments that are conical and continuous with one another. Preferably the first sub-segment is provided with a first angle and/or slope and the second segment is provided with a second angle and/or slope characterized in that the second angle and/slope is bigger than the first angle and/or slope relative to a common midline plane.

Optionally the abutment comprises a central borehole configured to receive a fixation screw, as is known in the art.

Optionally the abutment may feature an integrated fixation screw portion disposed distal to the implant interface segment. Preferably the integrated fixation screw portion is provided for coupling with an implant along its threaded borehole.

Embodiments of the present invention provide a dedicated dental tool for associated with and manipulating and/or tooling and/or maneuvering a dental implant according to embodiments of the present, the device featuring: a dental tooling connection interface for coupling with a dental hand piece tool that may be utilized to rotate a dental implant associated with the tool; a tooling body comprising a proximal portion, medial portion and a distal portion, the proximal portion is disposed distal to and is continuous with the tooling connection, the proximal portion defines a conical body having a proximal end and a distal end the proximal end configured to be wider than the distal end; the medial portion is disposed distal to the proximal portion and is fluid therewith, the medial portion is provided in the form of an anti-rotation interface for example including but not limited to a hexagon profile; the distal portion is disposed distal to the medial portion and is fluid therewith, preferably the distal portion is configured to have a body configured to have a smaller diameter than that of the medial portion so as to allow for entering into the dental implant borehole.

Optionally the medial portion is substantially cylindrical.

Optionally the dental implant insertion tool may be configured to have a hollow flow channel along its length so as to facilitate fluid flow therethrough for example for conducting a flowing fluid such as a fluid and/or gas. For example, the hollow flow channel may be utilized to couple with a suction port to facilitate creating of suction at the distal end. For example the hollow flow channel may be utilized for introducing a flowing fluid such as water and/or saline and/or gas and/or air through the distal end.

The conical body featuring a plurality of inter-digitation male connects disposed adjacent to the proximal end. Most preferably the conical body comprises at least two inter-digitation male connectors extending form the external surface that are provided for associating with corresponding female inter-digitation connectors disposed on an implant internal connection interface as previously described. Preferably the plurality of male inter-digitation connectors may be distributed evenly along the external surface of the conical body. Optionally the proximal portion comprises from two and up to about six inter-digitation male connectors.

Optionally the proximal portion may be provided from at least two or more conical sub-segments that are continuous and fluid with one another. Preferably each conical sub-segment forming the proximal portion are arranged such that the proximal portion maintains a substantially conical profile arrangement that is increasing diameter in the proximal direction, therein the distal sub-segment is the narrowest while the proximal sub-segment is the widest. Preferably a first (distal) sub-segment is provided with a first angle and/or slope and the second (proximal) sub-segment is provided with a second angle and/or slope characterized in that the second angle and/slope is larger than the first angle and/or slope relative to a common midline plane.

Optionally medial portion may be configured to have any anti-rotational configuration to match that distal anti-rotational platform of a dental implant for example including but not limited to at least one or more selected from the group consisting of internal six receptor sockets, scalloped, internal dodecagon, external dodecagon, internal hex internal, external hex, external octagon, internal octagon, external spline, internal spline, Morse taper, internal Morse taper, one piece, internal six lobe, external six lobe, internal tri lobe, external tri-lobe, internal six spline, external six-spline, internal thread, internal pentagon, external pentagon, external thread, internal square, external square, internal five lobe, internal four lobe, internal three spline, external triangle, internal eight spline, external six lobe, internal eight lobe, internal tube to tube plug in, triangular, polygonal of n sides where n>=3 or more, the like as is known in the art or any combination thereof.

Within the context of this application the term thread, threading or "threading portion" refers to a portion of an implant comprising threading and utilized for integrating and/or interfacing and/or securely coupling the implant structure within the bone facilitating implantation within the bone.

Within the context of this application the term "flute" may be interchangeable with any of the terms including but not limited to vents, grooves, recess or the like terms according to the art to refer to a portion of an implant provided with a cutting edge for tapping function, gathering function or the like.

Within the context of this application the term "proximal" generally refers to the side or end of an elongated medical device such as an implant that is intended to be closer to the performing medical personnel and/or practitioner. The term "proximal" may be interchangeable with the term "coronal" when referring to the coronal side of an implant.

Within the context of this application the term "distal" generally refers to the side or end of an elongated medical device such as an implant that is opposite the "proximal end", and is farther from the performing medical personnel and/or practitioner. The term "distal" may be interchangeable with the term "apical" when referring to the apical side of an implant.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof.

While the following description focuses on dental implants, however embodiments of the present invention are not limited to dental applications of a screw type endosseous dental implant, where embodiment of the present invention may be implemented in other skeletal bone implant applications for example orthopedics for other regions of the body.

Although the foregoing description is provided with reference and examples toward dental implants, such description and examples are provided for illustrative non-limiting purposes only and are not intended to limit the scope or spirit of the present invention, solely to dental application(s). The endosseous dental implant of the present application may be adapted for use with a plurality of optional applications and/or bones for example orthopedic application

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 2A is an illustrative schematic diagram of the dental implant according to an optional embodiment of the present invention;

FIG. 2B is an illustrative schematic diagram of the body framework of the dental implant according to an optional embodiment of the present invention;

FIG. 2E is an illustrative schematic diagram showing a cross sectional view of the anchor showing the threading profile of the dental implant according to an optional embodiment of the present invention;

FIG. 2F is an illustrative schematic diagram of the dental implant according to the optional embodiment of the present invention showing a single thread;

FIG. 3C is an illustrative schematic diagram showing an optional perspective view of the dental implant according to an optional embodiment of the present invention;

FIG. 3D is an illustrative schematic diagram showing an optional perspective view of the dental implant according to an optional embodiment of the present invention;

FIG. 4A is an illustrative schematic diagram showing a bottom view of the dental implant according to an optional embodiment of the present invention;

FIG. 4B is an illustrative schematic diagram showing a bottom view of the dental implant according to an optional embodiment of the present invention;

FIG. 4C is an illustrative schematic diagram showing a bottom view of the dental implant according to an optional embodiment of the present invention;

FIG. 5A is a schematic illustrative diagram showing a threading and flute parameter configuration of the implant anchor according to an optional embodiment of the present invention;

FIG. 5B is a schematic illustrative diagram showing a threading and flute parameter configuration of the implant anchor according to an optional embodiment of the present invention;

FIG. 5C is a schematic illustrative diagram showing a threading and flute parameter configuration of the implant anchor according to an optional embodiment of the present invention;

FIG. 6A is an illustrative schematic diagram showing a view of the dental implant coupled with optional abutment, according to an optional embodiment of the present invention;

FIG. 6B is an illustrative schematic diagram showing a view of the dental implant coupled with an optional abutment, according to an optional embodiment of the present invention;

FIG. 6C is an illustrative schematic diagram showing a view of the dental implant coupled with an optional abutment, according to an optional embodiment of the present invention;

FIG. 6D is an illustrative schematic diagram showing a view of the dental implant coupled with an optional abutment, according to an optional embodiment of the present invention;

FIG. 7A is an illustrative schematic diagram showing a view of an abutment, according to an optional embodiment of the present invention;

FIG. 7B is an illustrative schematic diagram showing a view of an abutment, according to an optional embodiment of the present invention;

FIG. 7C is an illustrative schematic diagram showing a view of an abutment, according to an optional embodiment of the present invention;

FIG. 7D is an illustrative schematic diagram showing a view of an abutment, according to an optional embodiment of the present invention;

FIG. 7E is an illustrative schematic diagram showing a view of an abutment, according to an optional embodiment of the present invention;

FIG. 7F is an illustrative schematic diagram showing a view of an abutment, according to an optional embodiment of the present invention;

FIG. 8B shows a schematic illustrative diagram of an exemplary dental implant threading according to an optional embodiment of the present invention;

FIG. 8C shows a schematic illustrative diagram of an exemplary dental implant threading according to an optional embodiment of the present invention;

FIG. 8D shows a schematic illustrative diagram of an exemplary dental implant threading according to an optional embodiment of the present invention;

FIG. 8E shows a schematic illustrative diagram of an exemplary dental implant threading according to an optional embodiment of the present invention;

FIG. 8F shows a schematic illustrative diagram of an exemplary dental implant threading according to an optional embodiment of the present invention;

FIG. 8G shows a schematic illustrative diagram of an exemplary dental implant threading according to an optional embodiment of the present invention;

FIG. 8H shows a schematic illustrative diagram of an exemplary dental implant threading according to an optional embodiment of the present invention;

FIG. 9A shows a schematic illustrative diagram of an optional embodiment for a dental implant according to an optional embodiment of the present invention;

FIG. 9B shows a schematic illustrative diagram of an optional embodiment for a dental implant according to an optional embodiment of the present invention;

FIG. 9C shows a schematic illustrative diagram of an optional embodiment for a dental implant according to an optional embodiment of the present invention;

FIG. 11A shows schematic illustrative diagram depicting an optional method according to embodiments of the present invention;

FIG. 11B shows schematic illustrative diagram depicting an optional method according to embodiments of the present invention;

FIG. 12A shows a schematic illustrative diagram depicting an optional method according to an embodiment of the present invention;

FIG. 12B shows a schematic illustrative diagram depicting an optional method according to an embodiment of the present invention;

FIG. 14A shows a schematic illustrative diagram of an optional embodiment for a dental implant according to an optional embodiment of the present invention;

FIG. 14B shows a schematic illustrative diagram of an optional embodiment for a dental implant according to an optional embodiment of the present invention;

FIG. 15F is an illustrative schematic diagram showing a view of an abutment having a universal connection platform, according to an optional embodiment of the present invention;

FIG. 15G is an illustrative schematic diagram showing a view of an abutment having a universal connection platform, according to an optional embodiment of the present invention; and FIG. 16 shows a schematic illustrative diagram of optional embodiment of a dental tool for introducing and/or inserting an implant according to an optional embodiment of the present invention.

DESCRIPTION OF THE PREFERRED EMBODIMENTS

Figure 1B:
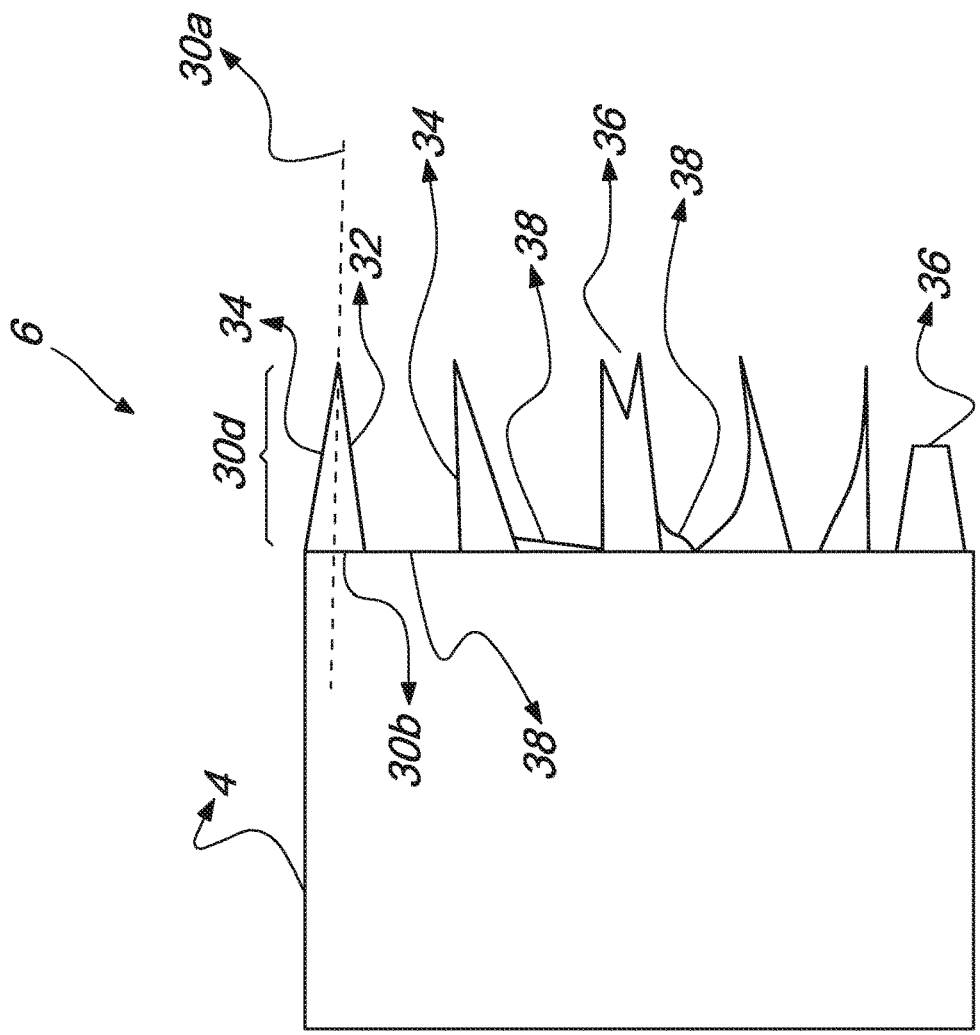
FIG. 1B shows schematic block diagram of aspects of dental implants.

The principles and operation of the present invention may be better understood with reference to the drawings and the accompanying description. The following figure reference labels are used throughout the description to refer to similarly functioning components are used throughout the specification hereinbelow.

| | |
|---|---|
| 10 | abutment; |
| 20 | abutment screw; |
| 50 | interface cavity; |
| 52, 54, | connection platform; |
| 30 | implant core threading; |
| 32 | apical side; |
| 34 | coronal side; |
| 36 | lateral edge; |
| 30b | a base; |
| 30d | thread depth; |
| 30a | horizontal plane; |
| 38 | inter-thread face; |
| 100 | dental implant; |
| 100p | proximal end/coronal end; |
| 100d | distal end/apical end; |
| 110 | coronal portion; |
| 110a, b, c | coronal segments; |
| 110d | coronal portion distal end; |
| 110p | coronal portion proximal end; |
| 112 | coronal threading; |
| 114 | external connecting platform; |
| 115 | coronal portion recessed grooves; |
| 115e | coronal extending extension; |
| 116 | surface connecting platform; |
| 118 | internal connecting platform; |
| 120 | body portion; |
| 120a | proximal segment; |
| 120b | distal segment |
| 120c | core; |
| 120d | distal end; |
| 120e | distal end dimension; |
| 120f | proximal end dimension; |
| 120p | proximal end; |
| 121 | core segments |
| 122 | flute; |
| 122r | flute recess; |
| 122n | flute neck; |
| 122e | flute bevel edge; |
| 122i | flute inner radius; |
| 122q | flute outer radius; |
| 122o | flute proximal opening; |
| 122p | flute bottleneck profile; |
| 122s | flute bottleneck shoulders |
| 124 | thread; |
| 124a | thread apical side surface/angle; |
| 124b | thread base; |
| 124c | thread coronal side surface/angle; |
| 124f | thread face edge or width; |
| 124i | inter-thread surface; |
| 124p | thread pitch; |
| 124L | thread lead; |
| 124o | thread angle |
| 124s | thread sub-segment, wing, blade; |
| 124w | thread flute face surface; |
| 125a | blade apical end; |
| 125c | blade coronal end; |
| 126 | apical end; |
| 126e | apical end edge; |
| 130 | one piece implant |
| 140 | horizontal plane contour modification; |

-continued

| | |
|---|---|
| 140m | medial-lateral contour modification; |
| 140a | anterior-posterior contour modification; |
| 140c | undercut |
| 142, 144 | thread horizontal plane sub-segments; |
| 150 | one recessed grooves; |
| 152 | outwardly extending extension; |
| 200, 230, 220 | Dedicated tool; |
| 202 | tool connection interface; |
| 204 | tooling surface; |
| 210 | implant interface portion; |
| 212 | central body portion; |
| 214 | ring portion; |
| 216 | distal end cap; |
| 224, 234 | cylindrical tooling body; |
| 236, 226a, 226b | tooling surface or edge; |
| 228, 238 | stopping interface portion; |
| 1300 | conical connection platform dental implant; |
| 1300a-c | variable diameter implants; |
| 1302 | internal conical connection platform; |
| 1302d | conical connection platform distal end; |
| 1302p | conical connection platform proximal end; |
| 1304 | connection platform threading; |
| 1305 | proximal portion; |
| 1305d | proximal portion distal end; |
| 1305p | proximal portion proximal end; |
| 1306 | first conical sub-segment; |
| 1308 | second conical sub-segment; 1310 medial portion; |
| 1311 | medial portion anti-rotation platform; |
| 1312 | medial portion recess; |
| 1314 | inter-digitation anti-rotational interface; |
| 1316 | proximal portion recess; |
| 1320, 1330 | abutment; |
| 1322, 1332 | abutment crown portion; |
| 1324, 1334 | abutment implant interface portion; |
| 1326, 1336 | inter-digitation male connector; |
| 1328 | snap fit male connector; |
| 1338 | medial portion anti-rotational platform; |

Figure 1A:
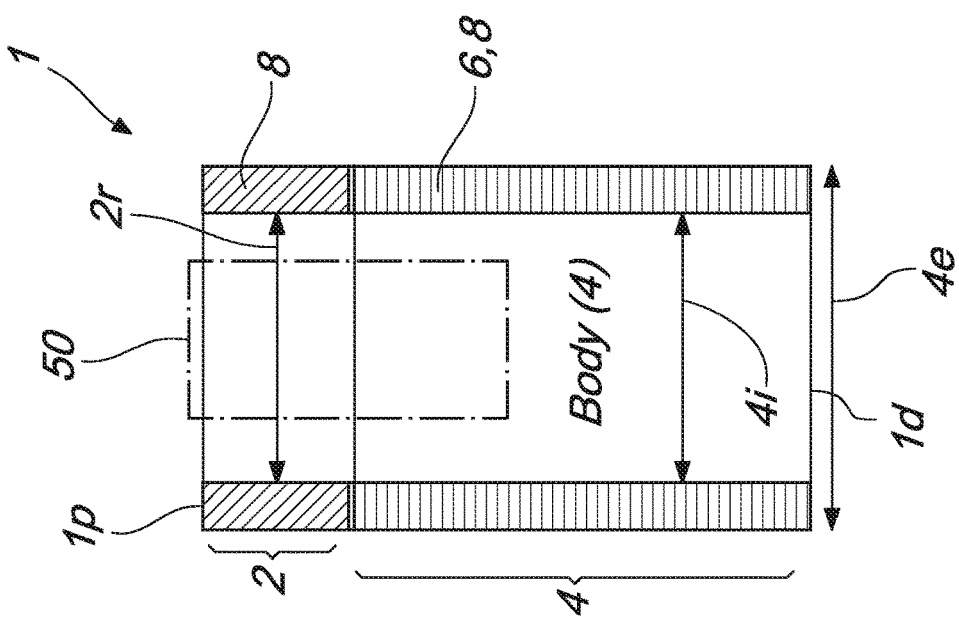
FIG. 1A shows schematic block diagram of aspects of dental implants.

FIG. 1A shows a schematic block diagram representation of a dental implant showing the main aspects of dental implant. A dental implant 1 includes a coronal portion 2 and a body portion 4 that are continuous with one another. The coronal portion 2 defines the proximal end 1p of the bone implant and the body portion 4 defines the distal end of 1d the implant 1. The body portion 4 comprises an inner core 4i that is fit with at least one threading 6 that extend horizontally along a horizontal plane 30a and progresses along the length of the implant body core 4. The inner core 4 defines an internal diameter 4i of body portion 4 while the threading 6 defines the external diameter 4e of the body portion 4.

The shape and/or profile of body portion 4 may be highly variable and may assume a plurality of shapes and/or configurations and/or profiles for example including but not limited to straight, tapered, conical, cylindrical, linear, parallel, symmetric, asymmetric, trapezoidal, mixed conical, segmented, multi segmented and any combination thereof.

Implant 1 may further comprise micro-threads 8 along either the coronal portion 2 and/or body portion 4. Optionally body portion 4 may comprise both micro-threads 8 and threading 6.

Figure 8A:
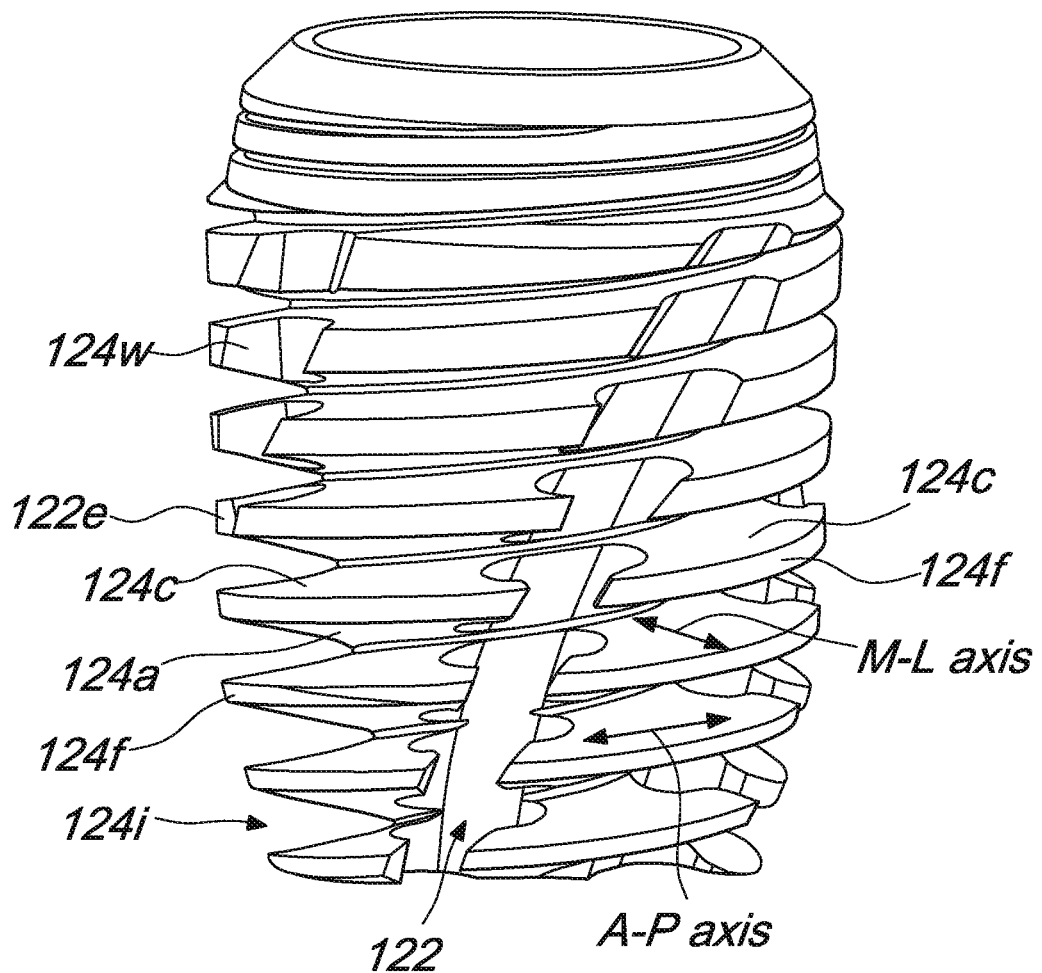
FIG. 8A shows a schematic illustrative diagram of an exemplary dental implant threading according to an optional embodiment of the present invention.

FIG. 1B shows a schematic block diagram representation of a dental implant threading 6 specifically showing aspects of dental implant thread. FIG. 1B shows different profiles of threading 6 that are known in the art having different characteristics. Thread 6 extends from the implant's core body portion 4 along a horizontal plane 30*a* represented by the dashed line. The horizontal plane 30*a* comprises two axes a first axis along the medial-lateral axis 'M-L', and a second axis, along the anterior-posterior axis 'A-P' extending around implant body 4, for example as shown in FIG. 8A The basic thread structure is an extension that has an apical side 32, a coronal side 34, and a lateral edge 36 that connects the apical side and the coronal side, a base 30*b* connecting the thread 6 to the implant core 4, a thread depth 30*d* that is defined between the lateral edge 36 and the base 30*b*.

The thread may also be defined by a plurality of additional parameters that provided and/or determine the thread characteristics that depict how the thread behaves relative to the bone. Thread parameters may for example including but not limited to: the contour of the inter-thread-face 38, the overall shape of the core body portion 4*i*, how the threads progresses along the length of the implant body, the number of starts, number of flutes, thread pitch, thread dispersal along the implant body, the like or any combination thereof.

Thread parameters and some known configurations are schematically shown in FIG. 1B, where the thread may comprises a straight segments or curved edge that are defined along the coronal side 34 and/or the apical side 32 of the thread. The thread may be configured to be symmetric or asymmetric relative to the horizontal plane 30*a*. The angulation of the thread, along any of its parts including the apical side 32, coronal side 34, lateral edge and inter-thread face 38 may be controlled.

The below description refers to collectively to FIG. 2-5 using the same reference labels for the same parts throughout the description.

FIG. 2A shows a schematic illustrative diagram of dental implant 100 according to an optional embodiment of the present invention. Anchor 100 comprises a proximal end 100*p*, as shown in FIG. 2E, and a distal end 100*d*, the distal end 100*d* also referred to as the apical end 126 of the implant.

Implant 100 has a substantially cylindrical or conical or circular cylindrical form, including a coronal portion 110 and a body portion 120. The body portion 120 comprising threading 124 that are fit with at least two or more flutes 122 disposed along the full length of implant 100.

The figures and description herewith depict an implant featuring coronal portion 110, body portion 120, threading 124 and at least two flutes 122. However, the present invention is not limited in its scope to cover an implant having all of these features in a single body and/or embodiment.

The present invention includes optional embodiments for an implant that may comprise at least one or more of the following features in any combination thereof, selected from the group consisting of: at least two flutes 122, coronal segment 110, and body core 120*c*.

FIG. 2A shows coronal portion 110 described and shown is a non limiting example of an optional coronal portion 110 that may be provided with implant 100. Coronal portion 110 is generally provided as an interfacing platform to facilitating coupling an implant with other dental implant components for example including but not limited to an abutment, a crown, a bridge, a dental prosthesis, an anatomical abutment, an angled abutment, a collar, a ball attachment, a healing cap, platform switching abutment, the like or any combination thereof.

The coronal portion 110 may be provided with an internal interfacing platform 50, for example as shown in FIG. 2E, or an external interfacing platform (not shown). Optionally an external interfacing platform may for example include but is not limited to an external hex configuration as is known in the art. Optionally the interfacing platform 50 provide s for coupling the implant with other dental implant structures such as crowns, abutments, transfers or the like. Optionally the interfacing platform 50 may provide a tooling interface provided for maneuvering and/or tooling the implant 100.

Figure 2D:
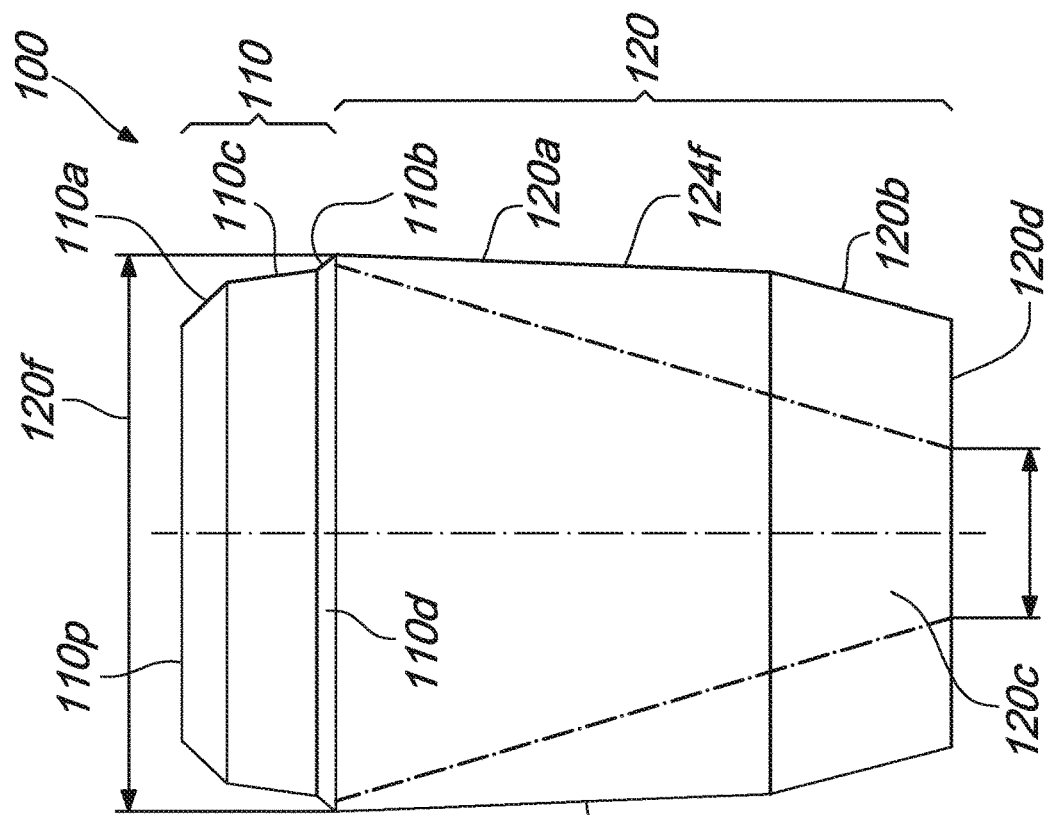
FIG. 2D is an illustrative schematic diagram of the body framework of the dental implant according to an optional embodiment of the present invention.

FIG. 2D, shows the overall shape of the various parts and segments forming implant 100. As shown coronal portion 110 and body portion 120 comprise substantially cylindrical body of varying diameter. Implant 100 is characterized in that the proximal end 120*p* of body portion 120 is configured to have a larger overall diameter than the distal segment 110*b* of coronal portion 110. Most preferably this allows a practitioner to gain access to a proximal portion of body portion 120 from the coronal portion 110, for example as will be described later with respect to flute 122.

Optionally, coronal portion 110 may comprise threading 112, FIG. 2A, along at least a portion of the external surface. Optionally and preferably threading 112 may be provided to improve bone retention and osseointegration, for example in the form of micro-threads. Optionally coronal threading 112 may be configured to have a double lead, with a pitch of about 0.5 mm and thread angle of about 25 degrees to about 35 degrees. Optionally threading 112 may be configured according to the configuration of the body portion threading 124 and may be configured to facilitate integration within the bone.

Optionally threading 112 may be configured according to at least one or more threading parameters as is known in the art, for example including but not limited to lead, pitch, thread angle, thickness, major diameter, minor diameter, taper angle, thread orientation, end position, start position, porosity, number of stops, number of starts, number of leads, number of cuts, lead in angle, the like or any combination thereof of threading variable and/or parameters.

Optionally coronal portion 110 may be devoid of threading 112.

Coronal portion 110 preferably comprises at least three or more substantially cylindrical segments and/or circular cylindrical segments that are continuous with one another. More preferably coronal portion 110 comprises three substantially cylindrical segments and/or circular cylindrical segments, 110*a-c*, for example as shown, FIG. 2C. Optionally each segment comprises a trapezoidal cross sectional profile having two parallel bases, defining the proximal diameter and distal diameter respectively of each segment and two angulated legs defining the external surface of the respective segment.

Optionally coronal segments 110*a-c* may be provided with an optional cross-sectional profile selected from circular, circular-cylindrical, cylindrical, conical, trapezoidal, the like or any combination thereof.

A first segment 110*a* defines the proximal segment of coronal portion 110 including the proximal end 110*p* of implant 100.

A second segment 110b defines the distal segment of coronal portion 110 and is continuous and fluid with the proximal portion of body portion 120.

Optionally and preferably a third segment 110c defines the medial segment of coronal portion 110. Most preferably medial segment 110c is disposed between proximal segment 110a and distal segment 110b. Optionally, coronal portion 110 may be configured to include at least one or more medial segments 110c.

Optionally medial segment 110c may be configured to have a circular-cylindrical profile wherein the proximal diameter of medial segments 110c and distal diameter of medial segments 110c are substantially equivalent to one another.

Optionally and preferably each of the coronal segments 110a-c have a proximal diameter and a distal diameter defined about the base of said trapezoidal profile. Preferably the diameter is sequentially increasing in the distal direction, such that the proximal diameter is smaller than the distal diameter of each of said segments. The individual coronal segments 110a-c preferably comprises an angled external surface corresponding to angle defined by the legs of the trapezoidal profile.

Optionally at least one or more of the coronal portion 110 segments 110a-c may serve as an optional connection platform for implant 100.

Optionally proximal segments 110a may serve and provide at least two connection platforms including an external connection platform 114 and surface connection platform 116.

Optionally and preferably the distal segment 110b may be configured to be continuous with body portion 120 of implant 100. Optionally and preferably the distal diameter the distal segment 100b is equal to the proximal diameter of body portion 120 and the proximal diameter of distal segment 110b is smaller than the proximal diameter of body portion 110.

Figure 3B:
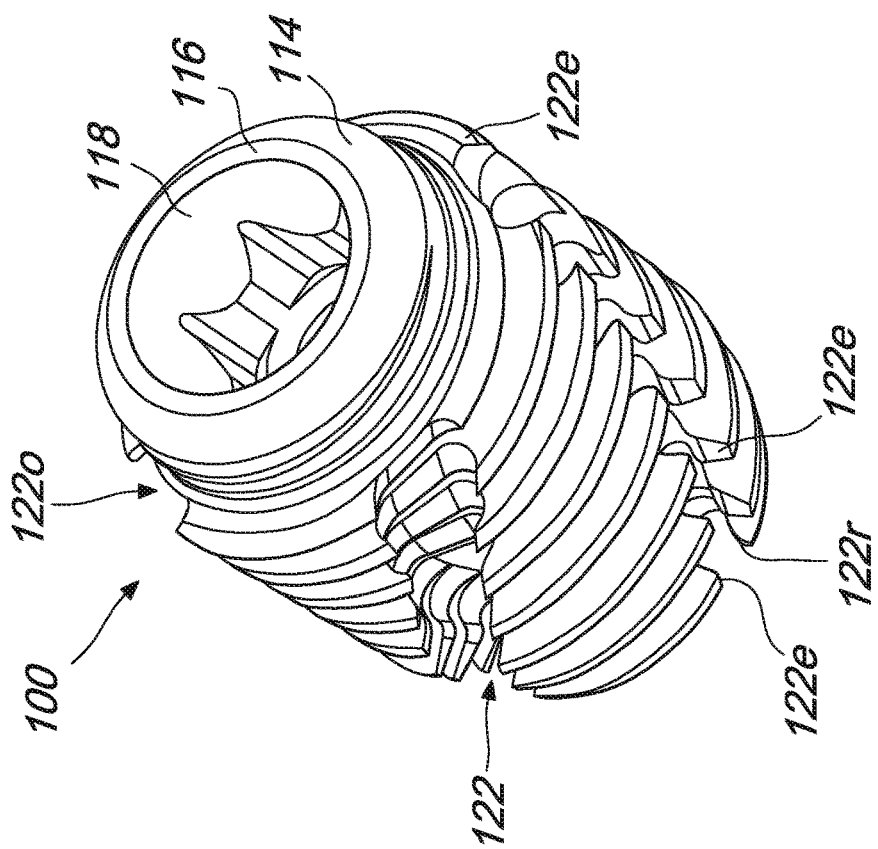
FIG. 3B is an illustrative schematic diagram showing an optional perspective view of the dental implant according to an optional embodiment of the present invention.
Figure 3A:
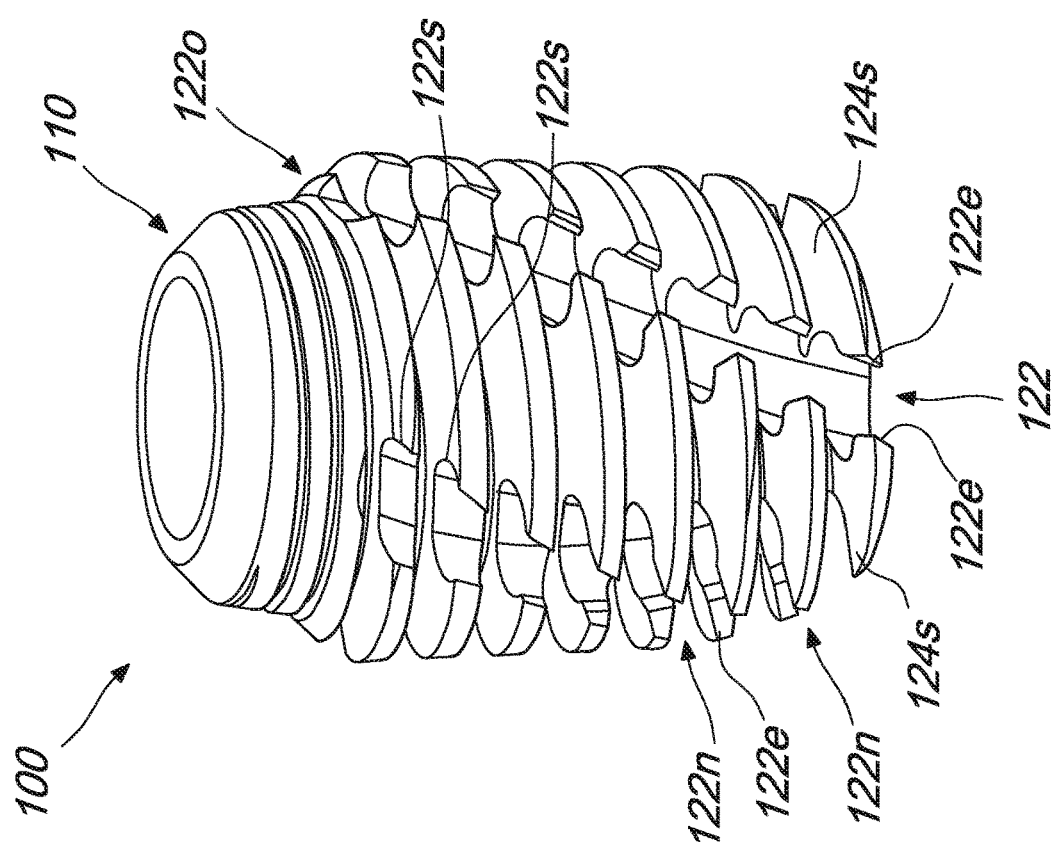
FIG. 3A is an illustrative schematic diagram showing an optional perspective view of the dental implant according to an optional embodiment of the present invention.

Optionally, as shown in FIGS. 2E and 3B, implant 100 may comprises a cavity disposed internally within implant 100 defined between the coronal portion 110 and at least partially within a proximal portion of body portion 120. Preferably the cavity 50 forms an opening at the proximal end 100p of dental implant 100 and may be configured to be a connecting platform 118 provided for coupling and/or associating with at least one or more dental implant components for example including but not limited to an abutment, a crown, a bridge, abutment screw, fixation screw, a dental prosthesis, an anatomical abutment, an angled abutment, a collar, a ball attachment, a healing cap, the like or any combination thereof.

Optionally cavity opening 50, FIG. 2E, may provide a least one or more connecting platforms 114, 116, 118, provided for connection optional dental implant components, for example an abutment 10 and abutment screw 20 as shown in FIG. 6A-E.

Optionally the cavity 50 may form at least two connecting platforms including at least one internal connecting platform 118 and at least one surface connecting platform 114.

Optionally the coronal portion 110 may further comprises an external structure configured to attach an abutment or the like dental implant components for example including but not limited to an abutment, a crown, a bridge, abutment screw, fixation screw, a dental prosthesis, an anatomical abutment, an angled abutment, a collar, a ball attachment, a healing cap, the like or any combination thereof.

Optionally coronal portion 110 may be configured to be coupled, and/or associated and/or integrated with an abutment 10 utilizing an abutment screw 20, as shown in FIG. 6A-E. Optionally coronal portion 110 may be configured to be coupled and/or associated with optional dental implant components for example including but not limited to an abutment, a crown, a bridge, abutment screw, fixation screw, a dental prosthesis, an anatomical abutment, an angled abutment, a collar, a ball attachment, a healing cap, the like or any combination thereof.

Coronal portion 110 extends distally (apically) toward the distal (apical) end 100d, therein defining the body portion 120 of implant 100. The proximal end 120p of body portion 120 is continuous with the distal end 110d of distal segment of 110b defining the overall largest diameter of implant 100, for example as seen in FIG. 2B, 2D.

Preferably the overall diameter of implant 100 is defined over its two portions, namely body portion 120 and coronal portion 110. Along the length of body portion 120 the overall implant diameter is apically decreasing from proximal end 120p to the apical end 100d. Along the length of coronal portion 110 the overall implant diameter is apically increasing from proximal end 110p to distal end 110d. Accordingly implant 100 is substantially cylindrical and/or circular cylindrical, having a barrel like shape along its outer diameter, for example as seen in FIG. 2B, 2D.

As best seed in FIG. 2B, 2D body portion 120 may comprise at least two sub-segments a proximal sub-segment 120a and a distal sub-segment 120b. Optionally and preferably body portion 120 more preferably core 120c may further comprise a plurality of sub segments 121 of varying dimension and configuration. Optionally each core sub-segment 120a, 120b, 121 may comprise a substantially cylindrical body having a trapezoidal profile each with a distally decreasing diameter such that the proximal diameter is larger than the distal diameter. Optionally core sub-segments 121 may be provided with a circular-cylindrical and/or trapezoidal profile.

Body portion 120 comprises a core 120c that spans along the length of body portion 120 from proximal end 120p to distal end 120d. Core 120c comprises an overall trapezoidal profile, FIG. 2E, where the distal end/apical end 120d defining the smallest diameter at the apical end 120d and the largest diameter defined at the proximal end 120p. Most preferably core 120c is substantially flat at the apical end 120d, 126.

As shown in FIG. 2B, 2D, optionally and preferably core 120c may be provided from a plurality of sub-segments 120a, 120b, 121 that may be configured to be cylindrical and/or trapezoidal.

For example as shown in FIG. 2B the core 120c may be configured to have a plurality of sub-segments for example, where profile line 121a shows an optional core profile comprising six sub-segments including proximal sub-segment 120a, distal sub-segment 120b that are intervened with four sub-segments 121. As can be seen sub-segments 121 may be configured to be cylindrical and/or trapezoidal and/or circular cylindrical in any arrangement however the overall core 120c diameter is sequentially apically decreasing.

FIG. 2B shows another optional configuration for core 120c, as shown profile line 121b comprises four core sub-segments including proximal sub-segment 120a, distal sub-segment 120b that are intervened with two sub-segments 121. As can be seen sub-segments 121 may be configured to be cylindrical and/or trapezoidal and/or circular-cylindrical in any arrangement however the overall core 120c diameter is sequentially apically decreasing.

Most preferably, core 120c defines the inner diameter of body portion 120, while the lateral face 124f of threading 124, extending outwardly form core 120c, defines the outer diameter of body portion 120.

As best seen in FIG. 2A, 2E, 2-3 core 120c is fit with threading 124 comprising at least one and more preferably two or more threads that extend along the length of body portion 120 from distal end 100d to proximal end 120p. Threading 124 comprises a base 124b connecting thread 124 to core 120c. Thread base 124b comprises an apical side 124a, a coronal side 124c, and a lateral edge 124f (defining the thread width) connecting the apical side 124a and the coronal side 124c. Thread base 124b having a thread depth defined between the lateral edge 124f and core 120c. The lateral edge 124f of the thread may be configured to have a variable width that increases along said body segment in a coronal direction, configured so that the smallest width of the lateral edge 124f of the thread is adjacent the distal segment 120b and the largest width of the lateral edge of the thread is adjacent the coronal segment 110.

Optionally and preferably thread 124 may be provided with variable thread depth that generally increases along the length of body portion 120 in an apical direction, so that the smallest depth of the thread is adjacent the coronal portion and the largest depth of each thread is adjacent the apical end 120d.

Optionally thread 124 may be provided with variable thread depth that is generally increasing along the length of body proximal segment 120a in an apical direction, and is generally decreasing along the length of body distal portion 120b in an apical direction, so that the smallest depth of the thread is adjacent the coronal portion and the largest depth of each thread may be found between the distal body portion 120b and proximal body portion 120a.

Most preferably threading 124 is provided in the form of double thread having at least two starts. Optionally threading 124 may be provided with a single start. Optionally threading 124 may be provided with a plurality of starts.

Most preferably the apical end 100d, 126, best seen in FIG. 3C-D, and FIG. 4A-C, features at least two cutting leading edge 126e tips that extends from the core 120c preceding the starting thread of each of thread 124 respectively therein acting as a lead-in to thread 124. Optionally and preferably leading cutting edge 126e may be configured to having a coronal side angle equal to the coronal angle of threading 124 so as to facilitate is start. Optionally and preferably leading edge 126e provides the initial bone drilling element contact therein stabilizing the implant 100.

Preferably threading 124 is provided with a thread angle from about 20 degrees to about 60 degrees. Optionally and preferably threading 124 is provided with a thread angle is provided from about 20 to about 40 degrees. Preferably threading 124 is provided with a thread angel of 35 degrees or 25 degrees.

Optionally thread 124 may be configured to a be a double lead thread having a thread angle of 35 degrees, a pitch of about 2.1 mm.

Optionally thread 124 may be configured to a be a double lead thread having a thread angle of 25 degrees, a pitch of about 1.1 mm to about 1.8 mm.

Optionally thread 124 may be further configured according to at least one or more threading parameters as is known in the art, for example including but not limited to lead, pitch, thread angle, thickness, major diameter, minor diameter, taper angle, thread orientation, end position, start position, porosity, number of stops, number of starts, number of leads, number of cuts, lead in angle, the like or any combination thereof of threading variable and/or parameters.

Implant 100 features at least two or more longitudinal channels 122 forming flutes that span the full length of body portion 120 along threading 124. Optionally thread 124 may feature at least two longitudinal flute recessed channels 122. Optionally and preferably may feature four longitudinally recessed channels 122, for example as shown in the figures.

Flutes 122 are preferably configured to mill bone, collect, condense and to disperse house bone when the dental implant 100 is rotated with a dental implant maneuvering tool, for example in the form of a dental hand-piece, both in the clockwise or counterclockwise direction.

Most preferably flute 122 features a proximal opening 122o that is accessible from the coronal portion 110. Optionally the proximal opening 122o, FIG. 3A-D, to flutes 122 provides for gaining access to flute 122 from coronal portion 110 so as to allow a practitioner to introduce bone, bone grafting material, bone generating medium, bone grafting media, bone growing medicaments and/or enhances into flute 122 therein facilitating the bone growth process and improving osseointegration of implant 100 at the implantation site for example about any portion of the mandible or maxilla. Optionally proximal opening 122o may also provide a window to remove any excess bone compacted within the flute 122. Optionally and preferably proximal opening 122o further provides for receiving and/or introducing bone in the occlusal most preferably for providing support of the gingiva.

Optionally and preferably flutes 122 form a channel along the length of body portion 120 featuring a longitudinal axis selected from the group consisting of linear, curved, arcuate, arched, sigmoidal, spiral the like or any combination thereof. The perspective view of FIG. 3C-D and FIG. 4B show an example of curved longitudinal axis of flute 122 that is curved along the length of body portion 120.

Optionally the longitudinal axis of flute 122 may be defined according to the profile of the core portion 120c, for example according to lines 121a,121b.

Optionally implant 100 comprising a plurality of flutes 122, individual flutes and/or group of flutes 122 may be fit with an independent longitudinal axis. For example, an implant comprising four flutes may be configured such that each pair of opposing flutes may have a different longitudinal axis. For example, an implant comprising 3 flutes may be configured such that each flute may have a different longitudinal axis.

Optionally and preferably an implant comprising a plurality of flutes may be configured to have the flutes distributed equally along the circumference of body portion 120, therein diving threading 124 into equally spaced thread sub-segments. For example as shown, implant 100 comprising four equally spaced flutes divides threading 124 into four winged members.

Optionally an implant comprising a plurality of flutes may be configured to have the flutes distributed unequally along the circumference of body portion 120, therein dividing threading 124 into a plurality of unequally spaced and sized thread sub-segments.

Preferably each flute 122 divides threading 124 into a number of smaller thread sub-segments equal to the number of flutes 122. As shown, implant 100 provided with four flutes 122 forming four winged thread sub-segments 124s.

Most preferably flute 122 is configured to have a bottle neck profile across the base and depth of threading 124. Therein flute 122 is formed between core 120c and threading lateral edge 124f. Preferably the bottleneck profile assumes an ovoid flask shape, for example as shown FIG. 5B-C.

Preferably the bottleneck profile 122p may be formed from two sigmoid curved shoulders 122s and a neck portion 122n, the shoulders 122s extending anteriorly from core 120c toward thread lateral edge 124f therein forming an ovoid shape recess 122r along the base to and forming a neck 122n across lateral surface 124f. Most preferably the long axis of ovoid recess 122r is defined along core 120c and the short axis is formed across the thread 124 base between core 120c and lateral face 124f.

Most preferably the bottleneck shaped recess flute 122 formed along thread 124 forms a plurality of thread sub-segments 124s, best seen in FIG. 4C, therein each sub-segment 124s forms a wing-shaped thread having two beveled edges 122e along the thread lateral face 124f defined by the neck portion 122n of flute 122. Most preferably this significantly increases the number of cutting edges provided along implant 100.

Most preferably flute 122 forms a plurality of sub-segments 124s and/or blades and/or wings, along threading 124, as seen in FIG. 4C, provides for significantly increasing the surface area of implant 100 therein facilitating osseointegration and ensuring a 360 degrees of implant support.

Apical end surface 126 optionally and preferably facilitates sinus lifting while maintaining the Schneiderian membrane by virtue of surface 126 being flat and/or apical to that the threads 124s therefore surface 126 may serve as a protective barrier of the Schneiderian membrane from threads 124s. Accordingly sinus lifting procedure may be facilitated by implant 100 in that bone may be directed apically, by rotation in both the clockwise and/or counter-clockwise direction, allowing for bone growth while distal end surface 126 further facilitates maintaining the integrity of the Schneiderian membrane.

Most preferably flute 122 is configured such that the length of shoulder 122s is gradually decreasing in a proximal direction along the length of implant 100, such that shoulders 122s are longest at the proximal end 100d and shortest at adjacent to coronal segment 110.

Optionally shoulder 122s is a sigmoid configured to have an inner radius 122i of about 0.4 mm and an external radius 122q of about 0.3 mm; wherein the inner radius 122i defines the ovoid recess 122r and the external radius defines the neck 122n, as best seen in FIG. 5B-C Optionally the ovoid recess 122r at its widest part has a distance of about 1.6 mm while the neck 122n at its widest has a distance of about 1.0 mm, as best seen in FIG. 5B.

Optionally flute 122 may be configured to have pitch of 35 mm along the length of implant 100. Optionally flute 122 may be configured to have a thread number of four. Optionally flute 122 may be configured to have a thread number equal to the number of flutes 122. Optionally flute 122 may be configured according to and/or as a function of at least one or more parameter defining threading 124.

Optionally flute 122 may be configured to have the threading profile according to at least one or more threading parameters for example including but not limited to lead, pitch, thread angle, thickness, major diameter, minor diameter, taper angle, thread orientation, end position, start position, porosity, number of stops, number of starts, number of leads, number of cuts, lead in angle, the like or any combination thereof of threading variable and/or parameters Most preferably the thread 124 and flute 122 are configured so as to provide a cutting surface and collect bone when implant 100 is rotated both clockwise or counterclockwise.

FIG. 5C shows optional configuration and profiles for flute 122 according to the present invention. FIG. 5C shows optional configuration of flute 122 wherein the profile 122p may be configured according to the size of the neck 122n, and the size of the ovoid recess 122r, for example a shown.

FIGS. 2B and 2D show optional profiles of body portion 120, showing optional configurations of the inner core 120c. As shown in lines 121a, 121b showing that core 120c may be configured according to a plurality of sub-segments 120a, 120b, 121 in optional combinations of cylindrical and/or trapezoidal and/or circular-cylindrical sub-segments.

Figure 2C:
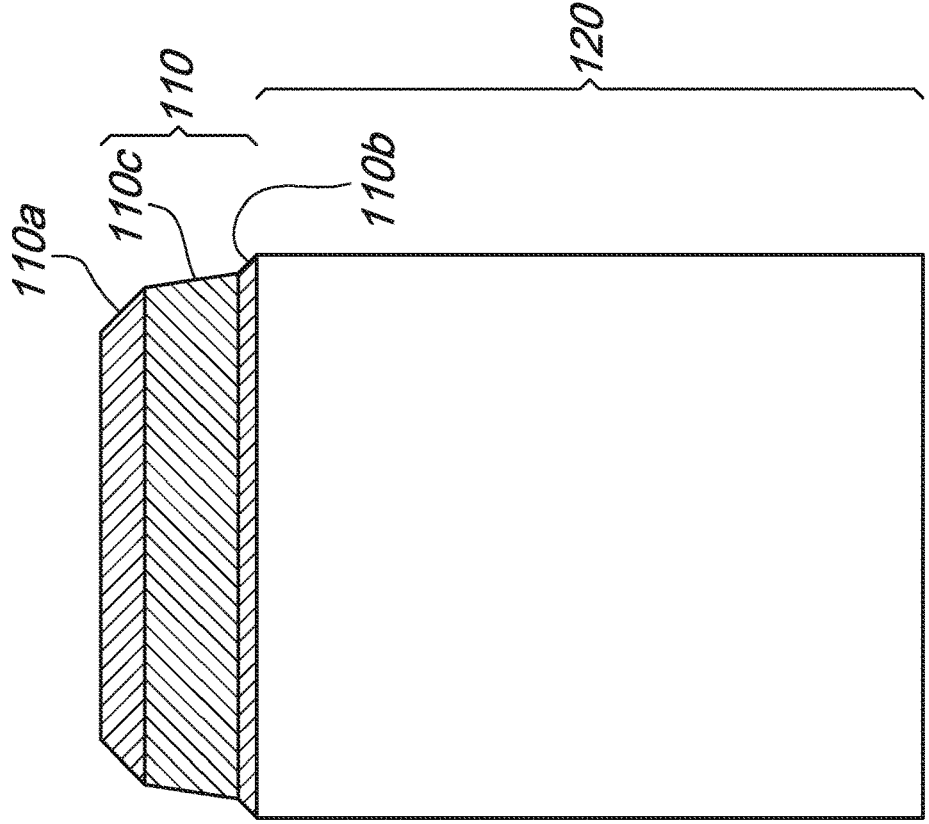
FIG. 2C is an illustrative schematic diagram of the body framework of the dental implant according to an optional embodiment of the present invention.

FIG. 2C shows an optional embodiment of the present invention therein showing coronal section 110 featuring three sub-segments 110a-c, as previously described. Optionally coronal section 110 may be fit on any optional implant body, and is therefore not limited to the implant body 120 as described herein.

FIG. 2E shows a cross section of implant 100 therein revealing threading 124 configuration and the core configuration 120c.

FIG. 3A-D show perspective views revealing an option internal interface cavity 50 that facilitates attachment to optional dental implant components, as previously described, for example including but not limited to an abutment, a crown, a bridge, abutment screw, fixation screw, a dental prosthesis, an anatomical abutment, an angled abutment, a collar, a ball attachment, a healing cap, the like or any combination thereof.

The perspective view provided by FIG. 3B further shows the coronal access to flute 122 via opening 122o.

FIG. 3C-D and FIG. 4A-C show an apical perspective view revealing apical end 126 including a cutting leading edge 126e and the onset of the double lead thread 124, as previously described.

FIG. 4C shows the formation of a plurality of thread sub-segments 124s and or wing and/or blade that is equal to the number of flutes 122.

Apical end 126 is substantially flat and including at least one cutting leading edge tip 126e extending from the core 120c preceding the start of each of thread 124. Optionally and preferably the cutting leading edge tip 126e preferably provides for stabilizing said implant within a bone, and allowing to allow for bone to grow around the implant 100. Accordingly tips 126e may be utilized to implant 100 within a 1 mm of bone and introducing bone grafting and/or generating medium around the surface of implant.

Preferably the apical end 126, 100d further comprises a first thread sub-segment 124s (wing, blade) having two opposing lateral beveled ends 122e along the lateral surface including a first (apical) wing end 125a and a second (coronal) wing end 125c. Optionally and preferably second (coronal) wing end 125c may further comprise an apical face 124a undercut therein elevating second (coronal) wing end 125c relative to said first (apical) wing end 125a, provided to facilitate drilling.

FIG. 4C further reveals the profile of flute 122 as a bottle neck formation 122p formed by two shoulders 122s forming a neck portion 122n and a recess 122r provided for collection and receiving bone as the drill is rotated in either clockwise or counterclockwise directions. Optionally and preferably the shape and/or profile 122p of flute recess 122r may be determined by controlling the size ratio of neck size 122n and recess 122r.

FIG. 5A shows an optional configuration of threading 124 show the thread pitch 124p, thread lead 124L shown as two leads, and thread angle 124o. FIG. 5A depicts and optional thread configuration where the number of thread leads 124L is two, the thread angle 124o equal to about 35 degrees and the thread pitch 124p of about 2.1 mm. Further optional thread parameter may for example be thread lead 124L of two, thread angle 124o equal to about 25 degrees, and thread pitch 124p of about 1.8 mm.

FIG. 5B shows an optional configuration of flute 122 showing the flute bottle neck profile 122p that is formed between two shoulders 122s having an internal radius 122i and an outer radius 122q to form a recess 122r and neck 122n.

FIG. 5C shows optional configurations and profiles for flute 122 according to the present invention having an ovoid base 122r and a neck portion 122n that may be configured relative to one another and form an edge 122e. The neck 122n preferably defines flute edge 122e on either side of the neck 122n. Optionally flute edge 122e may be configured to be symmetric or asymmetric about the neck 122n therein forming different configurations of flute edge 122e on either side of neck 122n for example as shown in FIG. 5C.

Optionally the flute 122 may assume different profiles, for example as shown in FIG. 5C, along its length. Optionally each flute 122 disposed with implant 100 may assume a different flute profile along its length.

FIG. 6A-F show optional abutments 10 that are associated with implant 100 with an abutment screw 20 each utilizing a different connecting platform provided with the implant 100. FIG. 6A shows implant 100 utilizing external connection platform 114 to support an optional abutment 10 along coronal segment 110c.

FIG. 6B shows a further optional abutment 10 supported on implant 100 utilizing external connection platform 114 without the use of surface connecting platform 116.

FIG. 6C-D shows use of an internal connection platform 118 formed with interface cavity 50 where abutments 10 emerges from with cavity 50 without interfacing with the external surface of coronal segment 110.

Figure 6G:
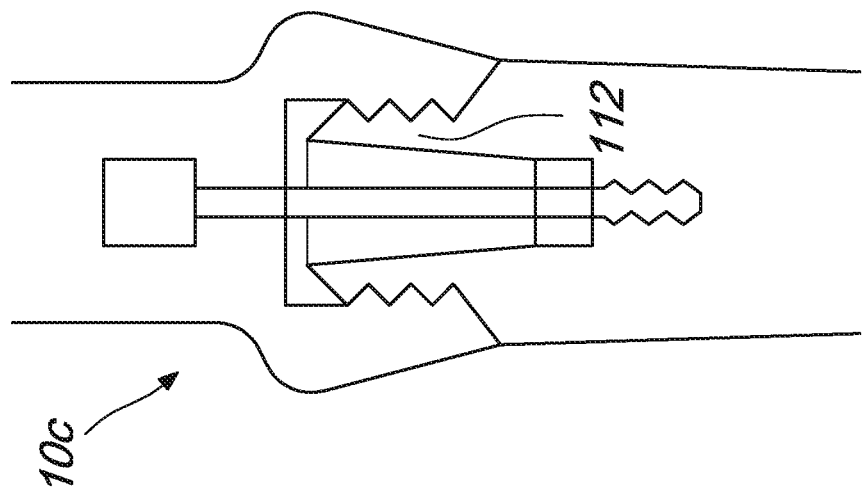
FIG. 6G is an illustrative schematic diagram showing a view of the dental implant coupled with an optional abutment, according to an optional embodiment of the present invention.
Figure 6F:
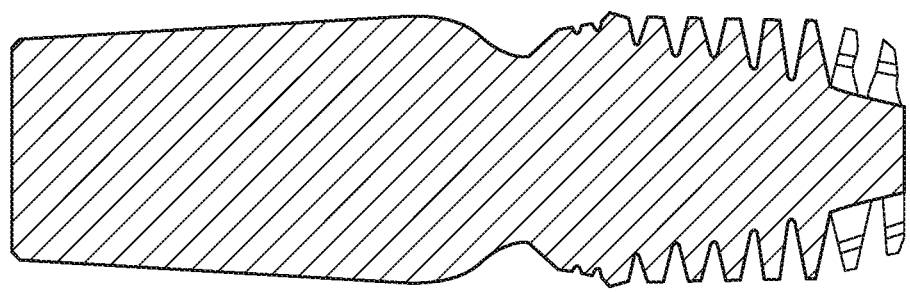
FIG. 6F is an illustrative schematic diagram showing a view of the dental implant coupled with an optional abutment, according to an optional embodiment of the present invention.
Figure 6E:
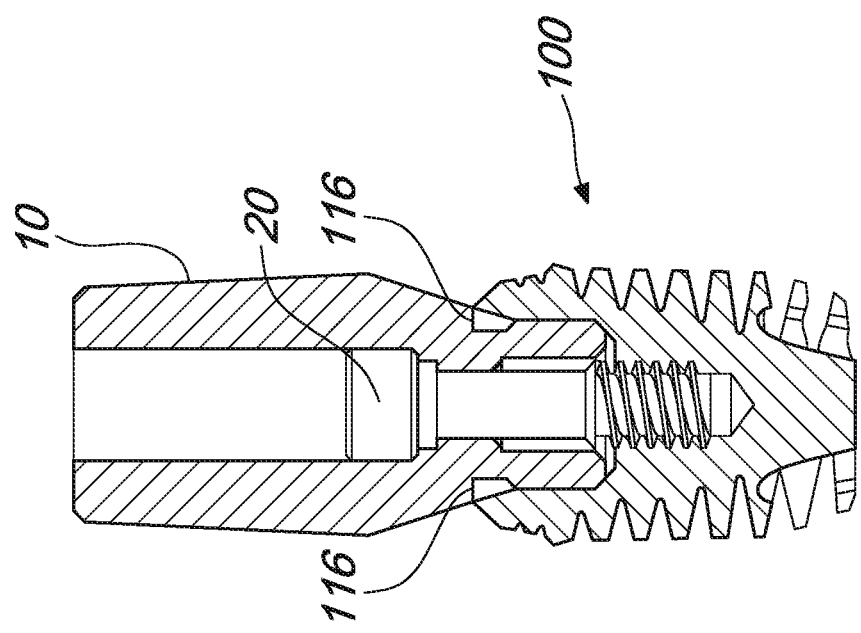
FIG. 6E is an illustrative schematic diagram showing a view of the dental implant coupled with an optional abutment, according to an optional embodiment of the present invention.

FIG. 6E shows an abutment 10 and locking screw 20 that utilize the surface connecting platform 116.

FIG. 6F shows an optional embodiments for a one piece dental implant 130 wherein the implant 100 according to optional embodiments is integrated and uniform with and abutment 10.

FIG. 6G shows an optional embodiment for a two piece dental abutment 10c, for example similar to that shown in FIG. 7F and FIG. 11A, that is configured to associate with the coronal portion 110, along threading 112 disposed along the coronal portion outer surface. Optionally abutment 10c may be further configured to resting along and seal with at least one coronal portion segments 110a-c, more preferably along distal segment 110b. Optionally such an abutment 10c may be utilized as an abutment replacement following bone resorption as described in greater detail in FIG. 11A.

Now referring to FIG. 7A-F showing optional embodiments for an abutment 10 in accordance with optional embodiments of the present invention, the abutment 10 is configured to associated and/or otherwise couple with the implant 100 along coronal portion 110 and/or any portion thereof 110a-c, 112, 114, 116, 118.

FIG. 7A-B show perspective view of optional abutments 10 according to an optional embodiment of the present invention.

FIG. 7C-E show a cross sectional views of the abutment depicted in FIG. 7A-B of optional configurations of abutment 10 showing the optional connection platforms utilized to associate and/or couple with implant 100.

Abutment 10 according to the present invention provides for coupling with implant 100 an therefore facilitates placement of the implant and abutment in optional configurations and emerging profile for example including but not limited to, bone level, tissue level, endosseous, or the like.

Most preferably abutment 10 in combination with implant 100 provide for proper implant location and emerging profile based on the implantation site and the mesio-distal plane, and/or the buccal-palatal plane, and/or the buccal-lingual plane.

Preferably abutment 10 comprises a mediating portion 16 that interfaces with the connecting profiles 116, 114, 118 of implant 100 to facilitate proper formation of the emerging profile at the implantation site relative to at least one plane selected from the group consisting of mesio-distal plane, and/or the buccal-palatal plane, and/or the buccal-lingual plane, or any combination thereof.

Abutment 10 has a proximal end 12 and a distal end 14 and medial portion 16 disposed therebetween. Abutment 10 comprises a substantially cylindrical core spanning proximal 12 end and a distal end 14, shown in dotted lines 10c (FIG. 7D, 7C) and defining an central axis 10a (FIG. 7C-D) of abutment 10 and an external surface that is contoured along the length of abutment 10 between distal end 14 and proximal end 12 to define the shape and configuration of abutment 10. Optionally and preferably each portion of abutment 10, namely distal 14, medial 16, proximal 12, may be surfaced to provide optional forms and functionality, as is known in the art. Most preferably an optional embodiment of the present invention provides an abutment 10 wherein medial portion 16 is configured to couple and/or interface and/or otherwise associate with at least one connecting profiles 116, 114, 118 of implant 100, previously described.

Optionally medial portion 16 may provide for platform switching, for example as shown where a wider base is provided along proximal portion 12 to facilitate a wide coupling base for a crown (not shown) coupled onto proximal portion 12.

Most preferably proximal portion 12 may be provided in optional forms for coupling to an overdenture abutment, bridge, denture, crown or the like restorative structure or prosthetic members. Optionally proximal portion 12 may be provided in optional attachment platforms and forms as is known in the art for example including but not limited to ball attachment, overdenture attachment, casting, UCLA, threaded, gold, snaps, angled, straight, angled, internal cap attachment, the like or any combination thereof.

Abutment 10 further comprises a prosthesis coupling portion 14c disposed along distal end 14. Preferably coupling portion 14c is configured to couple with implant 100 and is provided in optional configuration most preferably to facilitate anti-rotational coupling with coronal portion 110. Optionally and preferably coupling portion 14c comprises a coupling platform to mirror and couple with at least a portion of implant 100 preferably along coronal portion 110 such they fit in a one to one and/or male-female relationship, optionally and preferably about any portion or surface of coronal portion 110 for example including but not limited to 110a, 110b, 110c, 112, 114, 116, 118, or the like. For example an external coupling platform disposed about coronal portion 110, providing a male coupling member, may be coupled with a corresponding internal coupling platform 14c disposed on abutment distal end 14, therein comprising a female coupling member. For example an internal coupling platform disposed about coronal portion 110, providing a female coupling member, may be coupled with a corresponding external coupling platform 14c disposed on abutment distal end 14, therein comprising a male coupling member.

Coupling portion 14*c* is shown in a non-limiting optional external hex configuration, however it may be realized in a plurality of optional configurations. Optionally coupling portion 14*c* may be provided as an internal configuration, external configuration, or a combination thereof as is known in the art, that may for example be depicted according to the type of connection platform provided on implant 100 coronal portion 110. Optionally abutment 10 may be provided in optional anti-rotation forms for example including but not limited to at least one or more selected from the group consisting of internal six receptor sockets, scalloped, internal dodecagon, external dodecagon, internal hex internal, external hex, external octagon, internal octagon, external spline, internal spline, Morse taper, internal Morse taper, one piece, internal six lobe, external six lobe, internal tri lobe, external tri-lobe, internal six spline, external six-spline, internal thread, internal pentagon, external pentagon, external thread, internal square, external square, internal five lobe, internal four lobe, internal three spline, external triangle, internal eight spline, external six lobe, internal eight lobe, internal tube to tube plug in, triangular, polygonal of n sides where n>=3 or more, the like as is known in the art or any combination thereof.

Abutment 10 comprises a central bore 18 extending through at least a portion from proximal end 12 to distal end 14. Optionally and preferably central bore 18 is provided for receiving a fixation screw and/or an abutment screw 20. Optionally and preferably abutment screw 20 provides for coupling abutment 10 to implant 100 as previously described and shown in FIG. 5A-D.

Abutment 10 comprises a mediating portion 16 defined between proximal end 12 and distal end 14. Preferably mediating portion 16 defines the abutment's emerging profile as it emerges from implant 100 toward an implant crown (not shown). Most preferably mediating portion 16 provides for defining the abutment's connection platform utilized for coupling or otherwise associating with one of the three connection platforms 114, 116, 118 defined along implant 100, as previously described.

For example as shown in FIG. 7C shows mediating portion 16 comprising an abutment surface 16*a* provided for coupling and/or interfacing with internal connection platform 118 (as previously described). Optionally and preferably abutment surface 16*a* is a sloping surface gradually sloping from distal end 14 toward proximal end 12, most preferably surface 16*a* may be configured to have an angle from about 3 degrees and up to about 50 degrees, more preferably from about 4 degrees to about 45 degrees. Most preferably the angle of surface 16*a* may be defined and/or configured according to the connection platform 118 of implant 100.

For example as shown in FIG. 7D shows mediating portion 16 comprising an abutment surface 16*c* and 16*d* provided for coupling and/or interfacing with external connection platform 114 (as previously described). Optionally and preferably abutment surface 16*c* is a sloping surface having an angle from of up to about 70 degrees. Most preferably the angle of surface 16*b* may be defined and/or configured according to the connection platform 114 of implant 100. As shown, surface 16*c* extends from core formed by proximal portion 14 at the border with mediating portion 16. Preferably surface 16*c* comprises an extension 16*d* extending from core proximal portion 14. Surface 16*d* is substantially flat surface disposed substantially perpendicularly (about 90 degree angle) relative to the central axis of abutment 10 and/or abutment core. Surface 16*c* extends from surface 16*d* to form a down-sloping angle extending distally from surface 16*d* to form surface 16*c*, characterized in that surface 16*c* is provided with an angle from of up to about 70 degrees formed relative to surface 16*d*.

Optionally the length and/or dimensions of surface 16*a*, 16*b*, 16*c* and 16*d* are configurable and may be adjusted relative to the size and dimensions of implant 100, and/or at least one of connecting platforms 112, 114, 116, 118 and/or segment surface 110*a*, 110*b*, 110*c*.

For example as shown in FIG. 7E shows mediating portion 16 comprising an abutment surface 16*b* provided for coupling and/or interfacing with surface connection platform 116 (as previously described). Optionally and preferably abutment surface 16*b* is a substantially flat non-sloping surface that is substantially perpendicular (about 90 degrees) relative to the central axis of abutment 10 wherein surface 16*b* extends from the abutment core defined by distal portion 14 at the border defined between mediating portion 16. Most preferably the contour and/or angle of surface 16*b* may be defined and/or configured according to the surface connection platform 116 of implant 100.

FIG. 7F shows a cross sectional view of an optional abutment 10*c* that is configured to associate with the external surface of a coronal portion 110, where the coronal portion is fit with threading 112 and for which abutment 10*c* comprises the corresponding threading 15*t* provided for coupling therewith. Preferably abutment threading 15*t* is disposed along an the internal surface of a coronal portion cavity 15*c*, for example as shown. Optionally and preferably cavity 15*c* is configured to receive and couple with the coronal portion 110 of an implant 100 that features a coronal portion 110 having threading 112 disposed along at least a portion of its external surface. Optionally abutment 10*c* may further comprise a central bore 18 as previously described.

Embodiments of the present invention provide a novel thread configuration for dental implant, for example as shown in FIG. 8A-H. The thread and/or threading is configured to have at least one or more contour modification 140 relative to the horizontal axis 30*a* of the implant thread. The contour modifications may be disposed on at least one of the apical side 32 or coronal side 34 of the thread, relative to the thread's horizontal axis. The modifications 140 may be provided as a result of angulation that are defined along the horizontal axis 30*a*.

FIG. 8B-H show schematic illustrative diagrams of exemplary dental implant threading 6 according to optional embodiments of the present invention. FIG. 8B shows an optional thread profile along the horizontal plane 30*a*.

As previously described with respect to FIG. 1B threading 6 includes an apical side 32, a coronal side 34, and a lateral edge 36 connecting the apical side and the coronal side, a base 30*b* connecting the thread to the core, a thread depth 30*d* defined between the lateral edge and the base. The thread depth 30*d* is defining along the medial-lateral axis (M-L) of the horizontal plane 30*a* of the thread; the adjacent threads defined between adjacent thread base 30*b* are connected over the external surface of an implant core 4 defining an inter-thread face 38.

The thread apical side 32 or thread coronal side 34 may be fit with at least one contour modification 140 along at least one axis of the horizontal plane 30*a*, including the medial-lateral axis M-L axis as shown in FIG. 8A and/or the anterior-posterior axis A-P axis. Preferably contouring along at least one axis of the horizontal plane defines at least two sub-segments 142,144 along the horizontal plane 30*a*, for example as shown in FIG. 8B-H.

As shown in FIG. 8A the contour modification may be realized along the M-L axis for example as shown in thread contour 140m, or along the A-P axis as shown in thread contour 140a.

Optionally the thread may comprise at least one or more horizontal contour modifications 140. Optionally there may be up to about five contour modifications 140 along the horizontal axis on either the apical side 32 or the coronal side 34 and along at least one axis of the horizontal plane.

Optionally each contour modification may 140 assume a variable angle of up to about 180 degrees along each of the apical side 32 or coronal side 34.

Optionally the modification 140 may form a substantially symmetric thread surface along the thread, for example as shown in FIGS. 8B and 8G. Optionally the thread surface may be configured to be substantially asymmetric for example as shown in FIG. 8C-F.

Optionally the horizontal plane modification 140 may be applied along at least one of apical side 32 or coronal side 34 and may be curved (FIG. 8E-F) and/or linear (FIG. 8B-C) or it may comprise a combination thereof for example as shown in FIG. 8G.

Optionally each additional contour modification 140 introduced along at least one axis of the horizontal plane increases the number individual sub-segment defined along the horizontal plane by at least one sub-segment 142,144.

Optionally at least one of the thread apical side 32 or the thread coronal side 34 may be individually fit with at least one and up to five contour modifications 140 along either the medial-lateral axis forming a modification 140m or along the anterior posterior axis 140a.

Optionally the implant 100 may be configured to include at least two threading 124, wherein each may be individually configured to include at least one or more horizontal plane modification 140.

Optionally each of the plurality of threading 124 may be collectively and/or individually/independently configured along its horizontal plane 30a to include the at least one horizontal plane thread modification 140 in either the M-L axis or the A-P axis and along at least one of the thread apical side 32, thread coronal side 34, and/or thread lateral edge 36.

Optionally the contour modification 140 may define an angle of up to about 180 degrees relative to the horizontal plane 30a.

Optionally the thread may be configured to be symmetric about at least one axis of the horizontal plane 30a.

Optionally the thread may be configured to be asymmetric about at least one axis of the horizontal plane 30a.

Optionally at least one of: the thread apical side 32 or the thread coronal side 34 or the lateral edge 36, may feature at least one recessed grooves 150, for example as shown in FIG. 8G. Optionally thread 124 may be fit with a plurality of recessed grooves 150, for example as shown in FIG. 8G.

Optionally the recessed grooves 150 may assume any shape.

Optionally at least one dimension of the recessed grooves (150) is configured to be from about 0.01 mm up to about 0.7 mm.

Optionally the depth of thread 124 may be configured to be from about 0.1 mm up to about 2 mm. Optionally the inter-thread face 38 may be configured to assume any shape or angle.

Optionally the inter-thread face 38 may for example include but is not limited to: contoured, curved, angled, linear, the like, or any combination thereof.

Optionally the inter-thread face 38 may be substantially linear having an angle of up to about 60 degrees.

Optionally the inter-thread face 38 may comprise a length of up to about 2 mm.

Optionally at least one surface selected from: the thread apical side 32, the thread coronal side 34, the lateral edge 36, the inter-thread face 38, further comprise at least one outwardly extending extension 152, for example as shown in FIG. 8G. Optionally the threading may comprise a plurality of the outwardly extending extension (152).

As shown in FIG. 8A the contour modification may be realized along at least one axis of the horizontal plane in at least one of M-L axis for example as shown in thread contour 140m, or along the A-P axis as shown in thread contour 140a.

Figure 8I:
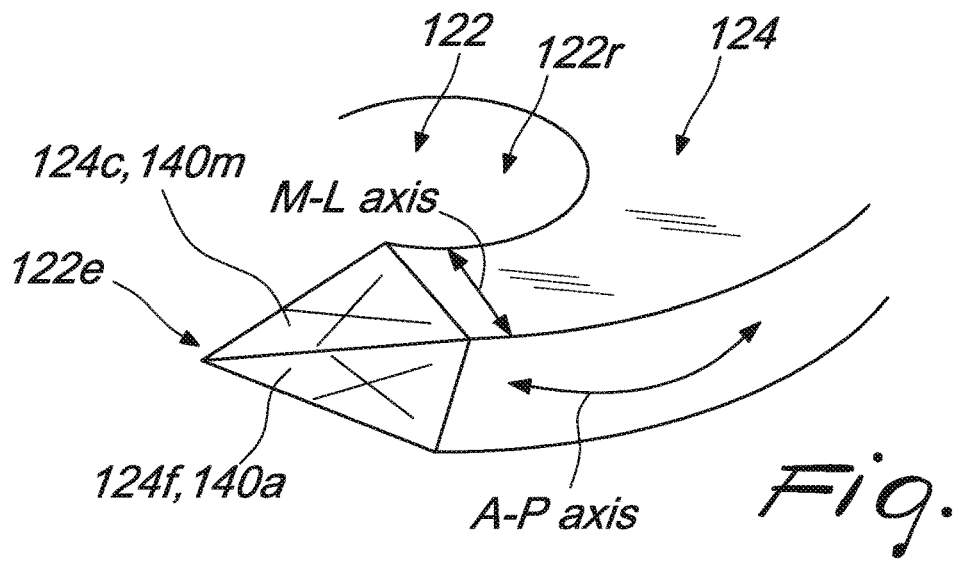
FIG. 8I shows a schematic illustrative diagram of an exemplary dental implant threading according to an optional embodiment of the present invention.

FIG. 8I shows a horizontal plane contour modification 140a, 140m that is applied onto thread 124 forming an edge 122e that is pointed, for example as shown, provided for cutting, compacting and directing bone into flute 122. Edge 122e is formed with two contour modifications 140a, 140m along the horizontal plane along the M-L axis and the A-P axis respectively, for example as shown. A first contour modification 140a is configured along the horizontal face 124f and a second contour modification 140m is configured along the coronal surface 124c.

Figure 8J:
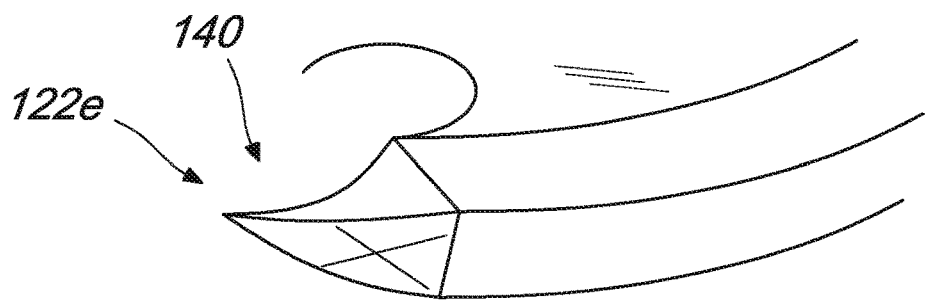
FIG. 8J shows a schematic illustrative diagram of an exemplary dental implant threading according to an optional embodiment of the present invention.

FIG. 8J shows a thread 124 similar to that shown in FIG. 8I where the thread coronal surface 124c is adjusted to introduce an undercut 140c to horizontal plane contour modification that is applied onto the M-L Axis.

Figure 8K:
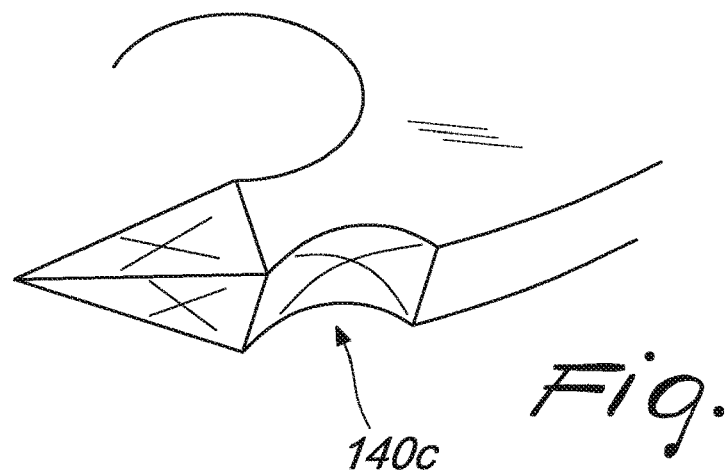
FIG. 8K shows a schematic illustrative diagram of an exemplary dental implant threading according to an optional embodiment of the present invention.

FIG. 8K shows an optional thread 124 where a horizontal plane contour adjustment is effected along the A-P axis along the thread edge 124f wherein an undercut 140c is introduced along the thread face 124, for example as shown.

FIG. 8L-P show optional horizontal plane thread modifications as previously described.

Figure 8L:
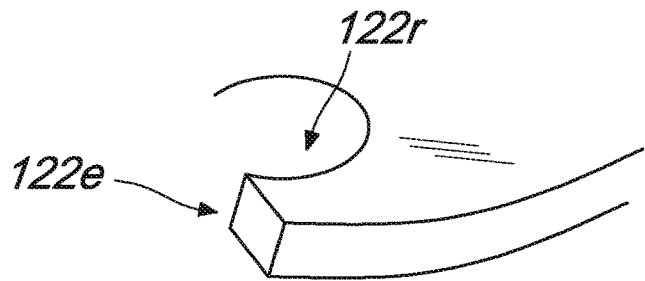
FIG. 8L shows a schematic illustrative diagram of an exemplary dental implant threading according to an optional embodiment of the present invention.

FIG. 8L shows an optional thread 124 having a flute edge 122e.

Figure 8M:
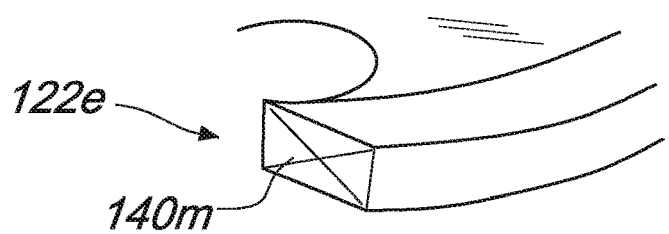
FIG. 8M shows a schematic illustrative diagram of an exemplary dental implant threading according to an optional embodiment of the present invention.

FIG. 8M shows a similar thread 124 where edge 122e, shown in FIG. 8L however further comprising a horizontal modification 140m to form a more pronounced angle at edge 122e, wherein edge 122e forms an acute angle with respect to flute recess 122r.

Figure 8N:
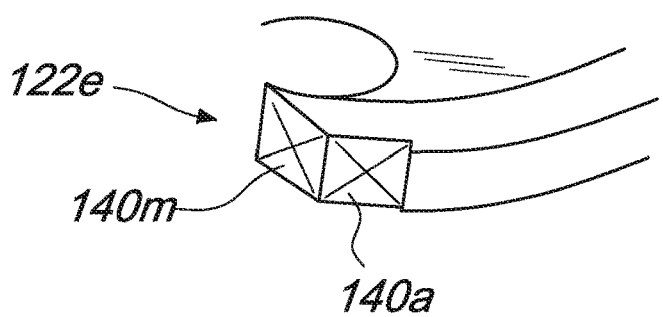
FIG. 8N shows a schematic illustrative diagram of an exemplary dental implant threading according to an optional embodiment of the present invention.

FIG. 8N shows a similar thread 124 where edge 122e, as shown in FIG. 8L-M however further comprising a second horizontal modification in the form of modification 140a along edge 124f along the A-P axis. Optionally thread 124 may comprise a plurality of such contour modifications.

Figure 8O:
FIG. 8O shows a schematic illustrative diagram of an exemplary dental implant threading according to an optional embodiment of the present invention.

FIG. 8O shows a similar thread 124 where edge 122e, shown in FIG. 8M however further comprising a horizontal modification along the M-L axis in the form of a curved undercut 140c producing a curved edge 122e. Optionally such a curvature 140c may be provided for increased osseointegration.

Figure 8P:
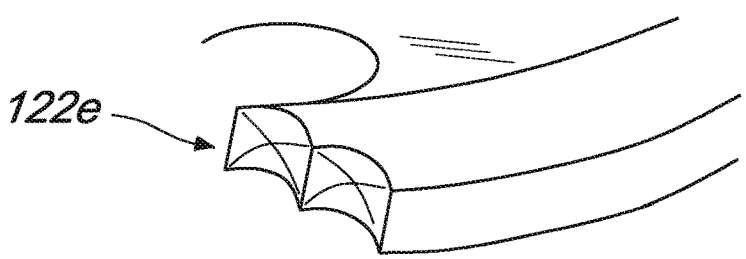
FIG. 8P shows a schematic illustrative diagram of an exemplary dental implant threading according to an optional embodiment of the present invention.

FIG. 8P shows thread 124 having a further horizontal surface modification wherein edge 124f is provided with a dual curved surface therein forming a multipoint edge 122e.

FIG. 9A show a schematic illustrative diagram of an optional dental implant 100 according to the present invention. Implant 100 comprises threading 130 that is configured to have horizontal contouring according to the present invention as previously described in FIG. 8A-H. FIG. 9A further depicts an implant having a coronal section 110 having functional threads 114 for interfacing with cortical bone. FIG. 9A further shows coronal section 110 comprising recesses and/or grooves 115 along the surface of the thread 114.

Optionally implant 100 may be further customized with the coronal segment 110b to facilitate removal of coronal segment should it become necessary due to bone resorption.

FIG. 9B shows a schematic illustration of a cross sectional depiction of a coronal portion 110 according to the present invention, specifically showing the two connection interfaces and/or platforms 50,52 configured to receive an abutment 20 and optionally a retention screw as is necessary.

FIG. 9C shows an optional embodiment of the present invention for a dental implant having a coronal portion that are fit with at least one or more recessed grooves 115 along the coronal portion surface. Optionally this may be applied to any implant having a coronal segment.

Optionally and preferably the coronal segment implant as previously described with respect to FIG. 2-4, featuring cortical cutting thread 124, may be fit with the recessed grooves 115.

Optionally the coronal portion 110 may be fit with a plurality of recessed grooves 115. Optionally recessed grooves 115 may be fit along coronal threading 112.

Optionally the recessed grooves 115 may assume any shape.

Optionally the recessed grooves 115 are configured to have at least one dimension from about 0.01 to 0.5 mm.

Optionally the shape of the recessed grooves may be selected from the group consisting of: oval, ovoid, ellipsoid, circular, quadrilateral, trapezoid, polygonal having n sides wherein n is at least three (n>2), and any combination thereof or the like.

Optionally the coronal portion (110) may feature at least one outwardly extending extension (115e). Optionally the coronal portion 110 may further comprise a plurality of the outwardly extending extension (115e).

Figure 10A:
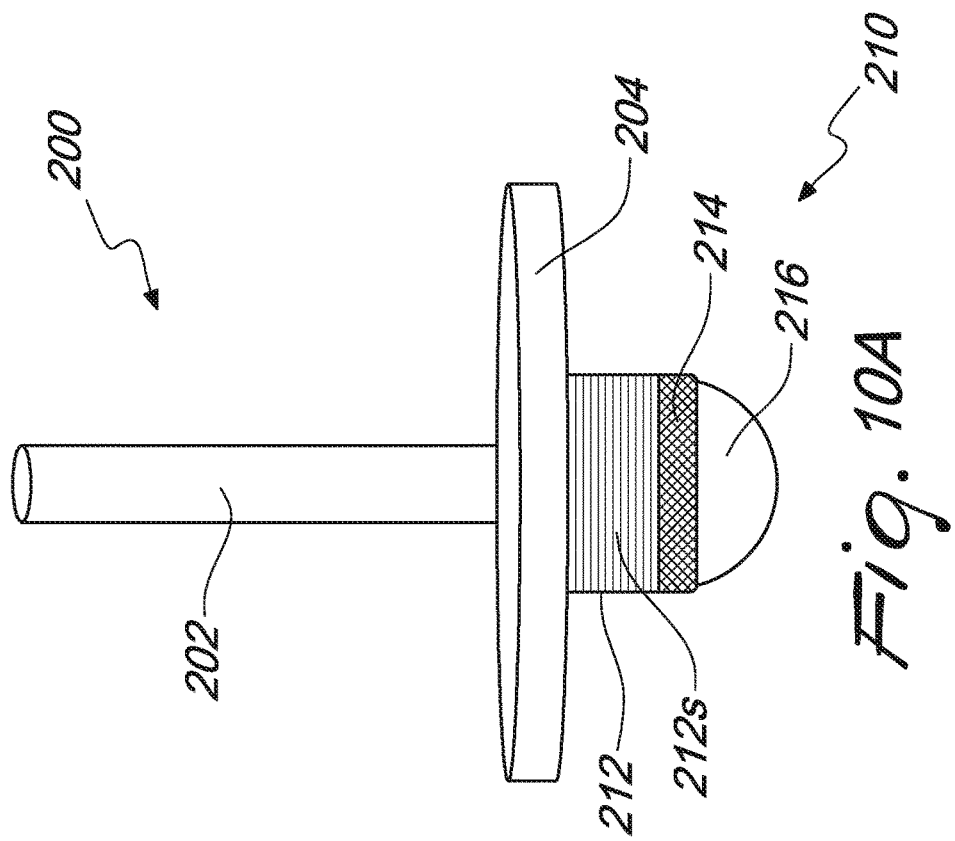
FIG. 10A shows a schematic illustrative diagram of an optional embodiment of a dental tool for removal of an implant's coronal section, according to an optional embodiment of the present invention.
Figure 10B:
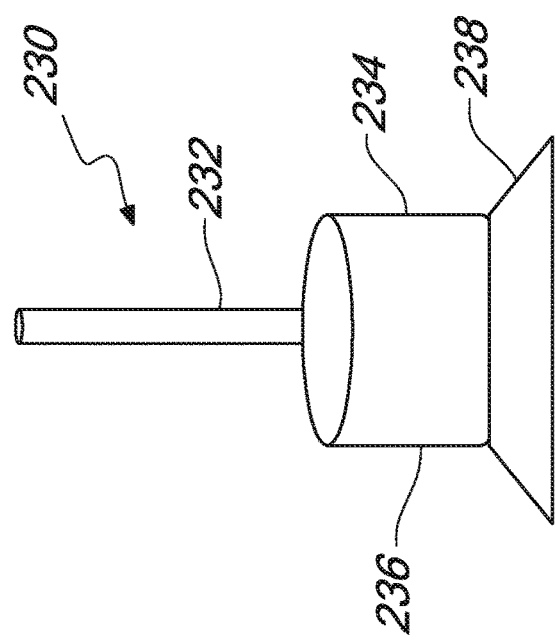
FIG. 10B shows a schematic illustrative diagram of an optional embodiment of a dental tool for removal of an implant's coronal section, according to an optional embodiment of the present invention.
Figure 10C:
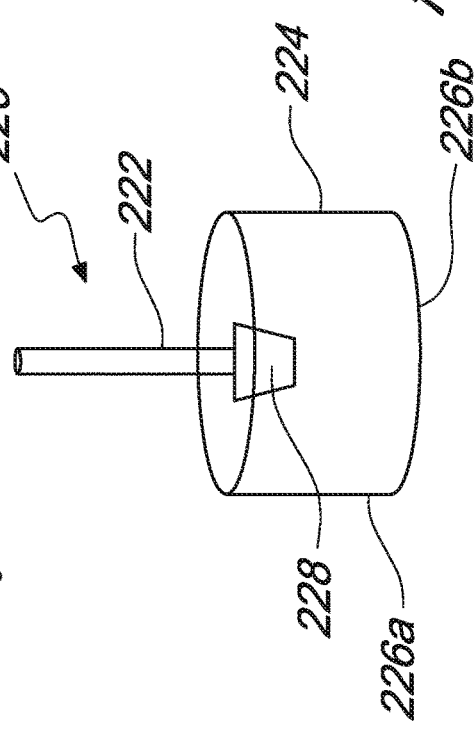
FIG. 10C shows a schematic illustrative diagram of an optional embodiment of a dental tool for removal of an implant's coronal section, according to an optional embodiment of the present invention.

FIG. 10A-C show schematic illustrative diagrams of optional embodiments of a dental tool according to an optional embodiment of the present invention. The tools are provided to facilitate removal of the coronal section of an implanted dental implant.

FIG. 10A shows an optional embodiment of a coronal portion removal tool 200, the dedicated tool 200 provided for filing and or removing a coronal segment 110 of a dental implant 100, the device featuring: a dental tooling connection interface 202 for coupling with a dental hand piece tool; a discoid tooling surface 204 having at least one surface or edge that may be coated with a medium provided for cutting and/or filing at least a portion of a dental implant 100; an implant interface portion 210 provided for inserting into a dental implant's borehole, the interface portion 210 including: a central body portion 212 for fitting within an implant's central borehole recess; a ring portion 214 for allowing the tool to freely rotate while associated with the implant borehole; and a distal end cap 216 for securely associating the tool with at least a portion of borehole portion and for sealing the implant borehole.

Optionally the central body portion of device 200 may be configured to be vertically flexible or adjustable. Optionally the central body portion may be fit with a spring 212s to facilitate height adjustment.

Optionally the central body portion may be configured to be telescopic.

Optionally the central body portion may have an adjustable diameter.

Optionally the central body portion comprises a core onto which a plurality of adapters may be fit so as to allow the central body portion to rotate freely within the dental implant central borehole.

Optionally the ring portion 214 comprises ball bearings.

Optionally the ring portion may comprises a friction reducing element to facilitate rotation.

Optionally the distal end cap 216 may be provided from materials and/or coatings selected from the group consisting of: silicone, Teflon or the like.

FIG. 10B-C show an optional embodiment for a dental tool 220,230 provided for filing and/or facilitating the removal of a coronal segment 110 of an implanted dental implant 100, the device featuring: a dental tooling connection interface 202 for coupling with a dental hand piece tool; a cylindrical tooling body 224,234 functionally coupled with the dental tooling interface 202 and configured to rotate when activated with the dental hand piece tool; the cylindrical tooling body 234,224 having at least one tooling surface or edge 236, 226a, 226b that may be coated with a medium provided for cutting and/or filing at least a portion of the coronal portion 110 of a dental implant 100; and a tooling stopping interface portion 238 provided for limiting the progressing of the cylindrical body 224,234 along the coronal segment of the implant.

The tool depicted in FIG. 10B differs from the tool shown in FIG. 10C in the stopping interface utilized. FIG. 10C utilizes a borehole stopper 228 while FIG. 10B utilizes an implant body skirt stopper 238.

Optionally and more preferably the cylindrical tooling body 234, 224 may comprise an open lower surface configured to receive the coronal portion 110 of the implant 100.

Optionally the tooling surface or edge 236, 226a, 226b may be disposed along the inner surface of the cylindrical tooling body 234,224.

Optionally the tooling surface may be fit with an abrasive medium for milling and/or cutting the implant about the coronal portion. Optionally the medium may for example include but is not limited to mediums selected from: diamond dust, diamonds, diamond like carbon, the like or any combination thereof.

Optionally the stopping interface portion 228 may be configured to associate with at least a portion of the coronal section 110 or the implant body 122,110b, for example as depicted in FIG. 10B.

Optionally the stopping interface portion 228 may be provided in the form of a skirt that may be configured to fit an upper portion of an implant body 120, wherein the skirt may be fit distally with the cylindrical tooling portion 234,224.

Optionally the stopping interface portion 238 may be provided in the form of an implant borehole adaptor provided to associated over an implant bore hole provided along the implant coronal segment 110, for example as shown in FIG. 10C.

FIG. 11-12 show schematic illustrative diagram depicting an optional method according to embodiments of the present invention when a dental implant experiences bone resorption over the years following implantation, where portions of the implant are exposed over time due to bone loss around the implant and particularly the coronal segment of the implant.

FIG. 11A shows one optional method of treating such bone resorption by exposing and cleaning the coronal portion of the implant to the bone level and then coupling the exposed coronal segment with a new abutment 22 configured to associate therewith.

Optionally the coronal portion 110 may be reconfigured and re-threaded with an optional dedicated tool for example as depicted in FIG. 10B-C.

FIG. 11B shows an alternative approach in treating bone resorption as a results of a dental implant. FIG. 11B schematically shows the exposure of the coronal segment over, followed by exposure and preparing for the removal coronal segment 110, while the implant remains is implanted within the bone. Optionally coronal portion 110 may be removed with any one of the optional tools depicted in FIG. 10A-C.

Similarly, FIG. 12A-B shows a schematic depiction of bone resorption over time at an implantation site. The coronal portion of the implant is first exposed and/or cleaned as is necessary and later the coronal portion is removed with a dedicated tool 220, 230, 200. FIG. 12B shows additional abutment configuration 20 that may be coupled to the implant devoid of a conical portion for example as shown.

Now referring to FIG. 13-16 discussing optional embodiments of the present invention for a dental implant internal connection platform as shown in FIG. 13-14, a corresponding abutment as shown in FIG. 14-15, and a dedicate implant introducing tool as shown in FIG. 16.

FIG. 13-16 show an dental implant, implant abutment and dedicated tool that are all interrelated by virtue of an internal conical interface platform that may be disposed on a dental implant and therefore requires a corresponding interface on any dental tool and/or structure that associates and/or interfaces with the implant.

Figure 13B:
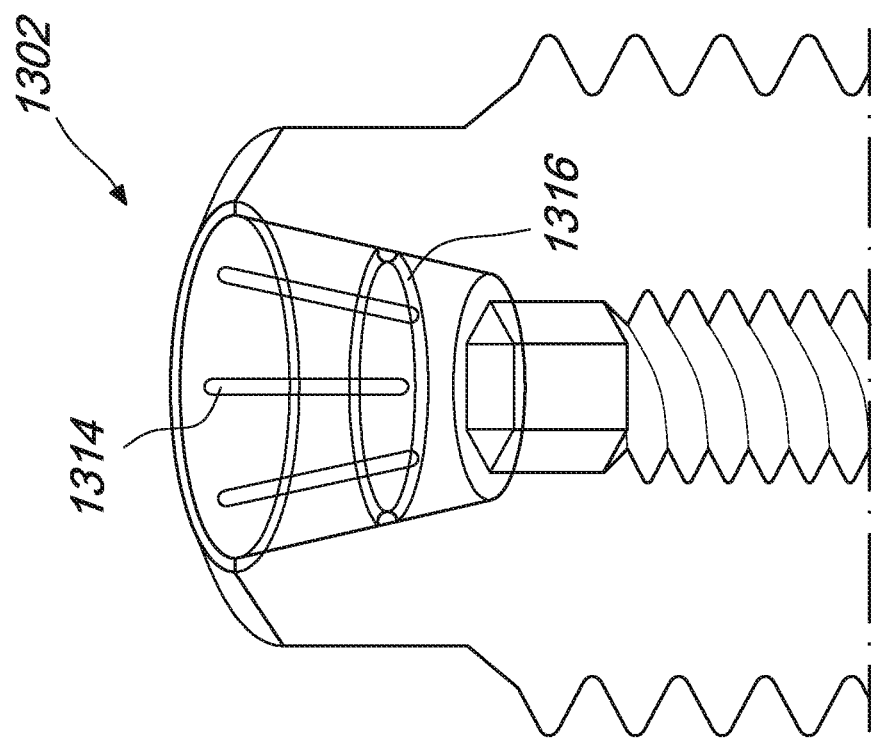
FIG. 13B shows a schematic illustrative diagram of an optional embodiment for a dental implant according to an optional embodiment of the present invention.
Figure 13A:
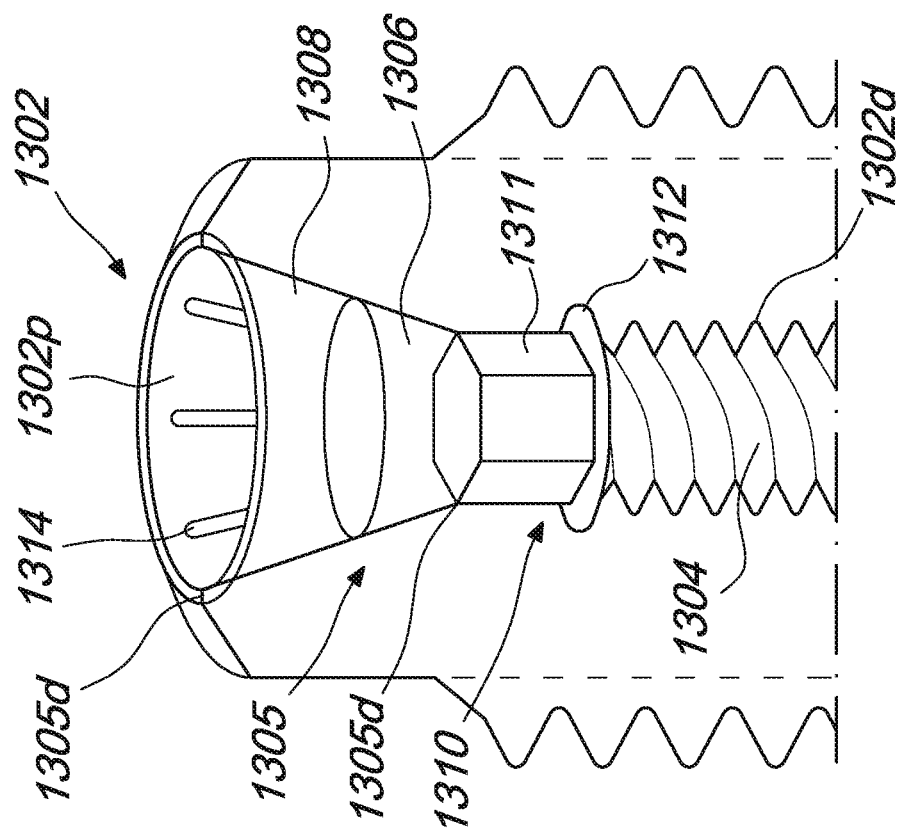
FIG. 13A shows a schematic illustrative diagram of an optional embodiment for a dental implant according to an optional embodiment of the present invention.

FIG. 13A-B show optional embodiments of the present invention for an implant 1300 having an internal conical connection platform 1302. Most preferably the dental implant 1300 has an internal conical connection platform 1302 along a borehole that is configured to receive a universal implant abutment 1320, 1330.

The internal connection platform 1302 is an internal borehole that extends distally from the proximal end of the implant 1300 at the coronal portion into the medial portion of the implant body. The internal connection platform 1302 is preferably centered along the implant body.

The implant connection platform 1302 preferably comprises a distal portion 1304, a medial portion 1310 and a proximal portion 1305 that are fluid and continuous with one another.

Optionally and preferably the connection platform 1302 is characterized in that the proximal portion 1305 comprises a universal conical profile, therein allowing the connection platform 1302 to act as an interfacing and/or receiving platform for a universal abutment 1320 (FIG. 14-15) for implants of various sizes and/or diameters.

Most preferably connection platform 1302 comprises at least two anti-rotational interfaces, a first anti-rotational interface 1311 disposed along the medial portion 1310 and a second anti-rotational interface 1314 disposed along the proximal portion adjacent to the implant's proximal end 1302p.

Preferably the distal portion 1304 is a substantially cylindrical borehole featuring threading that is provided for coupling with a fixation screw as is known in the art. Preferably the medial portion 1310 defines an anti-rotation interface 1311 in the form of an anti-rotation tooling interface that is provided for manipulating the implant with tools, for example in the form of an internal hex as shown in FIG. 13A-B.

Optionally medial portion anti-rotation connection interface 1311 may be provided in any anti-rotational tooling interface as is known in the art for example including but not limited to at least one or more selected from the group consisting of internal six receptor sockets, scalloped, internal dodecagon, internal hex, internal octagon, internal spline, Morse taper, internal Morse taper, internal six lobe, internal tri lobe, internal six spline, internal thread, internal pentagon, internal square, internal five lobe, internal four lobe, internal three spline, internal eight spline, internal eight lobe, internal tube to tube plug in, triangular, polygonal of n sides where n>=3 or more, the like as is known in the art or any combination thereof.

Most preferably the proximal portion 1305 is provided in the form of a substantially conical borehole having a its small diameter at its distal end 1305d bordering the medial portion 1304 and a large diameter at the proximal end 1305p defined at the implants proximal end 1302p.

Optionally and preferably the conical borehole 1305 defines a wall that is provided with a uniform angle and/or slope along the length of the proximal portion 1305 from the distal end 1305d to the proximal end 1305p, for example as shown in FIG. 13B.

Optionally the conical borehole 1305 may define a wall that is provided with at least two angles and/or slopes along the length of the proximal portion from the distal end to the proximal end, therein defining two proximal portion conical sub-segments 1306, 1308 that are continuous and fluid with one another, for example as shown in FIG. 13A. Preferably the first segment 1306 is provided with a first angle and/or slope and the second segment 1308 is provided with a second angle and/or slope characterized in that the second angle and/slope is bigger than the first angle and/or slope relative to a common midline plane.

Most preferably the proximal portion 1305 is fit with a second anti-rotation interface 1314 adjacent to the proximal end 1302p. Most preferably, the second anti-rotation interface 1314 may be provided along the conical borehole surface and/or wall, for example as shown in FIG. 13A. Preferably the second anti-rotation interface 1314 maintains the overall conical surface of the proximal portion 1305. Most preferably the second anti-rotation interface 1314 is provided in the form of a plurality of inter-digitation recesses dispersed along proximal portion wall adjacent to the proximal end, for example as shown in FIG. 13A-B. Optionally the recess 1314 may be configured to be horizontal or longitudinal along conical surface wall. Optionally and preferably the second anti-rotation interface 1314 may be provided in the form of a plurality of inter-digitation recesses dispersed along the conical borehole surface and/or wall.

Optionally the second anti-rotation interface 1314 may be provided with at least two or more inter-digitation recesses, Optionally the internal connection platform borehole 1302 may further feature a circumferential recess 1316, 1312 and/or groove along at least one of the medial portion 1310 (FIG. 13A) and/or along the proximal portion 1305.

Optionally proximal portion 1305 may be fit with a circumferential recess 1316, for example as shown in FIG. 13B. Optionally the circumferential recess 1316 may be configured to receive an O-ring for facilitating sealing and/or secure coupling with optional dental implant structures for example including but not limited to abutments, healing caps, impression coping abutment, measuring abutments, tools or the like.

Optionally medial portion 1304 may be fit with a circumferential recess 1312 and/or groove along its distal end that is adjacent to and/or bordering with the distal portion 1304.

Optionally the circumferential recesses 1316, 1312 may be configured to receive an O-ring (not shown) for facilitating sealing and/or secure coupling with optional dental structures for example including but not limited to abutments, healing caps, impression coping abutment, measuring abutments, tools or the like.

Optionally medial portion 1310 may be fit with at least one or more recess 1312 and/or grooves along its distal end that is adjacent to and/or bordering with the distal portion 1304.

FIG. 14A-B shows an optional embodiment of the present invention including a dental implant 1300 that is coupled and/or associated with an abutment 1320,1330 along the universal conical connection platform 1302.

Dental implant abutment 1330,1320 features an implant interface segment 1324,1334 and a crown interface segment 1332, 1322. The abutment 1320, 1330 characterized in that the implant interface segment 1332, 1322 that is configured to be a universal abutment interface capable of fitting a plurality of dental implant of various diameters and/or sizes, for example a large diameter implant 1300*a* or a medium sized diameter implant 1300*b*, or a small diameter implant 1300*c*. The abutments 1330, 1320 according to an optional embodiment of the present invention is configured to be a universal abutment that is capable of coupling and/or interfacing with various implants of different diameters, for example shown.

The abutment 1320,1330 may comprises at least one anti-rotational connection 1328, 1338 defining a first anti-rotational connection that is disposed along the distal part of the implant interface segment 1324, 1334, for example as shown.

Preferably the implant interface segment 1324, 1334 includes a distal portion 1328,1338 and a proximal portion 1335, the distal portion provided in the form of an anti-rotational interface and provided for matching the implant's anti-rotational interface.

Optionally the abutment may comprise at least two anti-rotational connection platforms a first anti-rotational connection platform disposed along the distal portion of the implant interface segment and a second anti-rotational connection platform disposed along the proximal portion of the implant interface segment. Optionally at least one of the two anti-rotational connection platforms may be provided in the form of inter-digitation connectors. Optionally both of the two anti-rotational connection platforms may be provided in the form of male inter-digitation connectors.

Optionally the distal portion's anti-rotational interface may be fit with a snap fit male connector for example including but not limited to a cog and/or flange and/or extension, the like or any combination thereof. Most preferably the snap fit male connector is provided to fit and securely couple with a corresponding female connector and/or recess disposed along an implant connection platform.

The abutment characterized in that the proximal portion of the abutment's implant interface segment features an external surface having conical profile that is widest at its proximal end adjacent and/or bordering with the abutment's crown interface segment, and configured to be narrowest adjacent to and/or bordering with the distal portion of the abutment's implant interface segment.

Optionally and preferably the proximal portion's conical external surface defines a wall that is provided with a uniform angle and/or slope along the length of the abutment's implant interface segment's proximal portion.

Optionally proximal portion's conical external surface defines a wall that is provided with at least two angles and/or slopes along the length of the proximal portion, therein defining two proximal portion sub-segments that are conical and continuous with one another. Preferably the first sub-segment is provided with a first angle and/or slope and the second segment is provided with a second angle and/or slope characterized in that the second angle and/slope is bigger than the first angle and/or slope relative to a common midline plane.

Optionally the abutment comprises a central borehole configured to receive a fixation screw, as is known in the art.

Optionally the abutment may feature an integrated fixation screw portion disposed distal to the implant interface segment. Preferably the integrated fixation screw portion is provided for coupling with an implant along its threaded borehole.

Figure 15A:
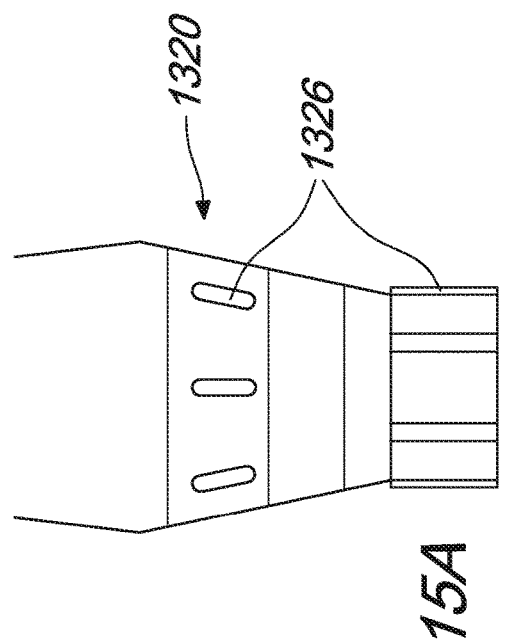
FIG. 15A is an illustrative schematic diagram showing a view of an abutment having a universal connection platform, according to an optional embodiment of the present invention.

FIG. 15A shows abutment 1320 having two anti-rotation connection platforms that are provided in the form of an inter-digitation.

Figure 15B:
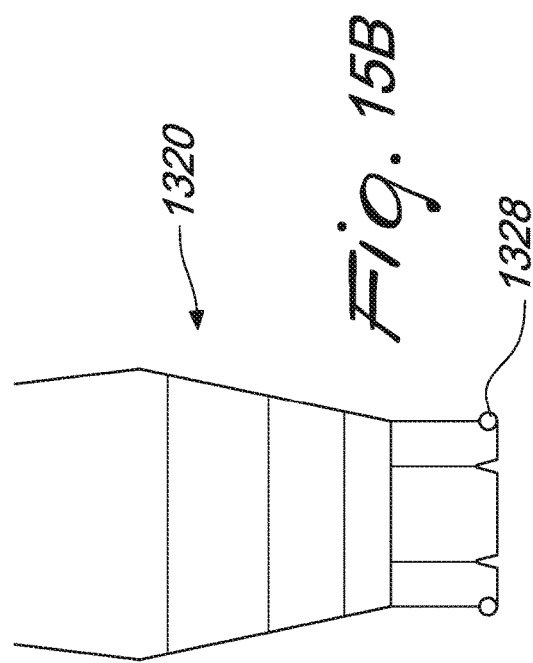
FIG. 15B is an illustrative schematic diagram showing a view of an abutment having a universal connection platform, according to an optional embodiment of the present invention.

FIG. 15B shows abutment 1320 having one anti-rotation connection in the form of a snap fit male connector interface 1328.

Figure 15C:
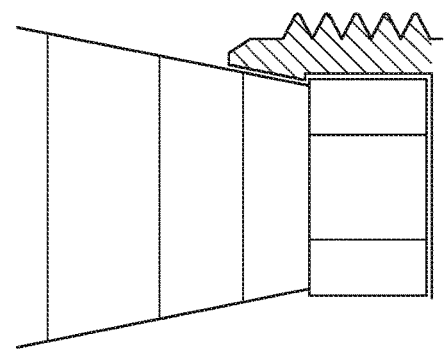
FIG. 15C is an illustrative schematic diagram showing a view of an abutment having a universal connection platform, according to an optional embodiment of the present invention.

FIG. 15C shows an optional abutment according to the present invention where the abutment is configured to associate within an implant borehole along the external conical surface wall.

Figure 15D:
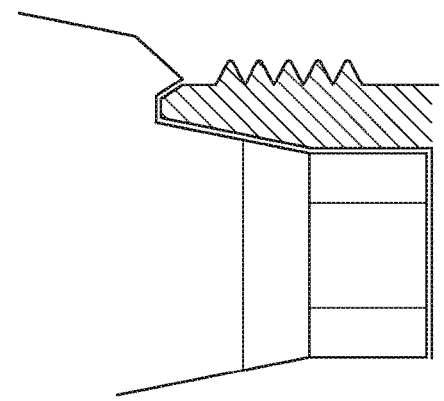
FIG. 15D is an illustrative schematic diagram showing a view of an abutment having a universal connection platform, according to an optional embodiment of the present invention.
Figure 15E:
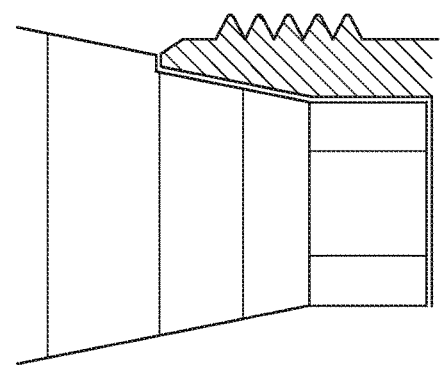
FIG. 15E is an illustrative schematic diagram showing a view of an abutment having a universal connection platform, according to an optional embodiment of the present invention.

FIG. 15D-E show a universal abutment according to the present invention that is further configured to couple with at least one connection platform provided along the coronal portion 110, for example as shown in FIG. 6 and as previously described.

FIG. 15F shows an impression copying abutment that is fit with the conical interface according to embodiments of the present invention, therein providing a universal impression copying abutment that may be associated and/or fit with a plurality of implants of different sizes.

FIG. 15G shows an healing cap that is fit with the conical interface according to embodiments of the present invention, therein providing a universal impression copying abutment that may be associated and/or fit with a plurality of implants of different sizes.

Optionally the universal conical interface according to embodiments of the present invention may be provided and/or fit on optional forms of dental tools, and/or devices that interface with an implant having the internal conical platform 1302 according to optional embodiments of the present invention.

FIG. 16 shows an optional embodiment of the present invention showing a dedicated dental tool 1350 for associating with and manipulating and/or tooling and/or maneuvering a dental implant 1300 according to embodiments of the present invention. The device 1350 features a dental tooling connection interface 1352 for coupling with a dental hand piece tool that may be utilized to rotate a dental implant associated with the tool;

a tooling body comprising a proximal portion 1355, medial portion 1358 and a distal portion 1360. As shown the proximal portion 1355 is disposed distal to and is continuous with the tooling connection interface 1352. Most preferably the proximal portion 1355 defines a conical body having a proximal end 1355*p* and a distal end 1355*d* where the proximal end is configured to be wider than the distal end.

The medial portion 1358 is disposed distal to the proximal portion 1355 and is fluid therewith, the medial portion 1355 is provided in the form of an anti-rotation interface for example including but not limited to a hexagon profile, for example as shown.

The distal portion 1360 is disposed distal to the medial portion 1358 and is fluid therewith, preferably the distal portion 1360 is configured to have a smaller diameter than that of the medial portion so as to allow for entering into the dental implant borehole.

Optionally the medial portion may substantially cylindrical.

Optionally the dental implant insertion tool 1350 may be configured to have a hollow flow channel (not shown) along its length so as to facilitate fluid flow therethrough for example for conducting a flowing fluid such as a fluid and/or gas. For example, the hollow flow channel may be utilized to couple with a suction port to facilitate creating of suction at the distal end. For example the hollow flow channel may be utilized for introducing a flowing fluid such as water and/or saline and/or gas and/or air through the distal end.

The conical body proximal portion 1355 features a plurality of inter-digitation male connects 1356, as shown, that are disposed adjacent to the proximal end 1355*p*. Most preferably the conical body 1355 comprises at least two inter-digitation male connectors 1356 extending form the external surface and are provided for associating with corresponding female inter-digitation connectors disposed on an implant 1300 internal connection interface 1302 as previously described in FIG. 13-14. Preferably the plurality of male inter-digitation connectors 1356 may be distributed evenly along the external surface of the conical body.

Optionally the proximal portion 1355 may comprise from two and up to about six inter-digitation male connectors.

Optionally the proximal portion 155 may be provided from at least two or more conical sub-segments 1354, 1356 that are continuous and fluid with one another. Preferably each conical sub-segment forming the proximal portion are arranged such that the proximal portion maintains a substantially conical profile arrangement that is increasing diameter in the proximal direction, therein the distal sub-segment 1354 is the narrowest while the proximal sub-segment 1356 is the widest. Preferably a first (distal) sub-segment 1354 may be provided with a first angle and/or slope and the second (proximal) sub-segment 1356 may be provided with a second angle and/or slope characterized in that the second angle and/slope is larger than the first angle and/or slope relative to a common midline plane.

Optionally medial portion 1358 may be configured to have any anti-rotational configuration to match that distal anti-rotational platform of a dental implant 1300 for example including but not limited to at least one or more selected from the group consisting of internal six receptor sockets, scalloped, internal dodecagon, external dodecagon, internal hex internal, external hex, external octagon, internal octagon, external spline, internal spline, Morse taper, internal Morse taper, one piece, internal six lobe, external six lobe, internal tri lobe, external tri-lobe, internal six spline, external six-spline, internal thread, internal pentagon, external pentagon, external thread, internal square, external square, internal five lobe, internal four lobe, internal three spline, external triangle, internal eight spline, external six lobe, internal eight lobe, internal tube to tube plug in, triangular, polygonal of n sides where n>=3 or more, the like as is known in the art or any combination thereof.

While the invention has been described with respect to a limited number of embodiment, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not described to limit the invention to the exact construction and operation shown and described and accordingly, all suitable modifications and equivalents may be resorted to, falling within the scope of the invention.

Having described a specific preferred embodiment of the invention with reference to the accompanying drawings, it will be appreciated that the present invention is not limited to that precise embodiment and that various changes and modifications can be effected therein by one of ordinary skill in the art without departing from the scope or spirit of the invention defined by the appended claims.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the appended claims.

Citation or identification of any reference in this application shall not be construed as an admission that such reference is available as prior art to the invention.

Section headings are used herein to ease understanding of the specification and should not be construed as necessarily limiting.

While the invention has been described with respect to a limited number of embodiments, it will be appreciated that many variations, modifications and other applications of the invention may be made.

What is claimed is:

1. A bone implant comprising:
   a coronal portion and a body portion that are continuous with one another, the coronal portion defining a proximal end of the implant and the body portion defining a distal end of the implant, the coronal portion being configured to have a smaller overall diameter than an overall diameter of the body portion, wherein:
   the body portion has an inner core, the inner core including at least one external thread extending from the inner core and along a length of the inner core;
   the inner core defines an internal diameter of the body portion and the threading defines an external diameter of the body portion;
   the inner core is continuous along the length of the body portion having a sequentially decreasing diameter such that a proximal diameter of the inner core is larger than a distal diameter of the inner core;
   the at least one thread extending from the inner core and along the length of the inner core, each thread including:
   an apical side, a coronal side, and a lateral edge connecting the apical side and the coronal side;
   a base connecting the thread to the core; and
   a thread depth defined between a lateral edge of the thread and the base;
   the inner core is configured from at least two sub-segments, a proximal sub-segment and a distal sub-segment,
   the at least one thread has a variable depth that is increasing along a length of the proximal sub-segment in an apical direction, and the variable depth of the at least one thread is decreasing along a length of the distal sub-segment in the apical direction, so that a smallest depth of the at least one thread is adjacent to the coronal portion of the inner core and a largest depth of the at least one thread is located between the distal sub-segment and proximal sub-segment;

the at least one thread includes at least two starts, and at least two longitudinal recesses extending along the length of the body portion therein defining at least two flutes defined along an entire length of the body portion;

the at least two flutes are configured to mill, collect, condense or disperse bone when the bone implant is rotated, the at least two flutes each have a proximal opening that opens into the coronal portion at a location where the diameter of the coronal portion is smaller than the diameter of the body portion, the proximal opening of each of the at least two flutes is configured to render each of the at least two longitudinal recesses of the at least two flutes accessible from the coronal portion of the bone implant, the proximal opening of each of the at least two flutes is provided for removing or introducing bone therethrough; and the at least two flutes are formed across a depth of the at least one thread between the base of the at least one thread and the lateral edge of the at least one thread, the at least two flutes having an ovoid shape when viewed in an axial direction of the bone implant, such that a profile of the at least two flutes forms an ovoid recess along the base of the at least one thread and a neck formed along the lateral edge of the at least one thread.

2. A bone implant comprising:

a coronal portion and a body portion that are continuous with one another, the coronal portion defining a proximal end of the bone implant and the body portion defining a distal end of the bone implant, the coronal portion being configured to have a smaller overall diameter than an overall diameter of the body portion wherein:

the body portion including an inner core, the inner core including at least one external thread extending from the inner core, the at least one external thread being defined along a length of the inner core and from an apical end to a coronal end of the body portion;

the at least one external thread includes at least two longitudinal recesses extending along the length of the body portion therein defining at least two flutes defined along an entire length of the body portion, the at least two flutes being configured to collect bone when the bone implant is rotated, the at least two flutes each have a proximal opening that opens into the coronal portion at a location where the diameter of the coronal portion is smaller than the diameter of the body portion;

the proximal opening of each of the at least two flutes is configured to render the longitudinal recess of the at least two flutes accessible from the coronal portion of and the bone implant, the proximal opening of each of the at least two flutes is provided for removing or introducing bone therethrough;

the at least two flutes are formed across a depth of the at least one thread between a thread base and a lateral edge of the at least one thread; and the at least two flutes have an ovoid shape when viewed in an axial direction of the bone implant, such that a profile of the at least two flutes defines an ovoid recess formed along the thread base of the at least one thread and a neck formed along the lateral edge of the at least one thread or the at least two flutes are configured to have a bottle neck profile across the thread base of the at least one thread and the depth of at least one thread.

3. The bone implant of claim 2, wherein:

the flute profile is defined according to a size ratio between the neck and the ovoid recess, and the neck portion defines a beveled cutting edge along the lateral edge of the at least one thread.

4. The bone implant of claim 2, wherein the profile is defined by two sigmoid curved shoulders extending anteriorly across from a thread core toward the lateral edge of the at least one thread forming therein the ovoid shape recess along the thread depth and forming the neck adjacent to the lateral edge, the neck defining a beveled cutting edge.

5. The bone implant of claim 2, wherein:

the at least two flutes are equally spaced along the at least one thread; or at least three of the flutes are disposed along the length of the body portion; or at least four of the flutes are disposed along the length of the body portion.

6. The bone implant of claim 2, wherein:

the at least two flutes form respective channels along the length of the body portion, each flute of the at least two flutes having a longitudinal axis along the respective channel, the longitudinal axis of each flute of the at least two flutes being selected from a group consisting of: linear, curved, arcuate, arched, sigmoidal, spiral, or any combination thereof;

the longitudinal axis is defined according to a core of the body portion, or the at least two flutes are fit with an independent longitudinal axis; or all flutes are provided with a same longitudinal axis; or opposite flutes are provided with a same longitudinal axis; or each thread sub-segment includes two lateral beveled ends defined along a lateral surface.

7. The bone implant of claim 2, wherein:

the bone implant is configured to be both cutting and collecting on sequential threads; or the at least two flutes are configured to span a full 360 degrees circumference of the at least one thread therein providing full implant support; or the at least two flutes divide the thread into a number of thread sub-segments equal to a number of flutes; or the at least one thread is configured to be at least one selected from a group consisting of: self-drilling; self-tapping, self-collecting, self-cutting, bone condensing or any combination thereof.

8. A bone implant comprising:

a coronal portion and a body portion that are continuous with one another, the coronal portion defining a proximal end of the bone implant and the body portion defining a distal end of the bone implant, the coronal portion being configured to have a smaller overall diameter than an overall diameter of the body portion, wherein:

the body portion includes an inner core, the inner core including at least one external thread extending along a length of the inner core and from an apical end to a coronal end of the body portion;

the at least one external thread includes at least two longitudinal recesses along the length of the body portion therein defining at least two flutes defined along an entire length of the body portion, the at least two flutes being configured to collect bone when the bone implant is rotated, the at least two flutes each have a proximal opening that opens into the coronal portion at a location where the diameter of the coronal portion is smaller than the diameter of the body portion;

the proximal opening of each of the at least two flutes is configured to render the longitudinal recess of the at least two flutes accessible from the coronal portion of the bone implant and provided for removing or introducing bone therethrough;

the at least two flutes are formed across a depth of the at least one thread between a thread base and a lateral edge of the at least one thread; and the at least two flutes have an ovoid shape when viewed in an axial direction of the bone implant, such that a profile of the at least two flutes defines an ovoid recess formed along the thread base of the thread and a neck formed along the lateral edge of the thread, the neck defines a beveled cutting edge along the lateral edge of the thread, the beveled cutting edge forming an acute angle with respect to the longitudinal recess.

* * * * *